(12) United States Patent  
Tomita

(10) Patent No.: US 9,282,241 B2
(45) Date of Patent: Mar. 8, 2016

(54) IMAGE PROCESSING DEVICE, IMAGE PROCESSING METHOD, AND IMAGE PROCESSING PROGRAM

(71) Applicant: Panasonic Intellectual Property Corporation of America, Torrance, CA (US)

(72) Inventor: Hiroto Tomita, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/400,568

(22) PCT Filed: May 2, 2013

(86) PCT No.: PCT/JP2013/002923
§ 371 (c)(1),
(2) Date: Nov. 12, 2014

(87) PCT Pub. No.: WO2013/179580
PCT Pub. Date: Dec. 5, 2013

(65) Prior Publication Data
US 2015/0172540 A1 Jun. 18, 2015

(30) Foreign Application Priority Data

May 30, 2012 (JP) ................... 2012-122991

(51) Int. Cl.
*H04N 5/232* (2006.01)
*H04N 5/783* (2006.01)
(Continued)

(52) U.S. Cl.
CPC .......... *H04N 5/23229* (2013.01); *G11B 27/005* (2013.01); *G11B 27/28* (2013.01); *H04N 5/783* (2013.01); *H04N 9/8205* (2013.01)

(58) Field of Classification Search
CPC .. G11B 27/005; G11B 27/28; H04N 5/23216; H04N 5/23229; H04N 5/783
See application file for complete search history.

(56) References Cited

U.S. PATENT DOCUMENTS

2010/0034457 A1* 2/2010 Berliner ............. G06K 9/00362
382/154
2011/0210970 A1 9/2011 Segawa
(Continued)

FOREIGN PATENT DOCUMENTS

JP 10-145724 5/1998
JP 2004-260765 9/2004
(Continued)

OTHER PUBLICATIONS

International Search Report issued Aug. 6, 2013 in International (PCT) Application No. PCT/JP2013/002923.

*Primary Examiner* — Huy T Nguyen
(74) *Attorney, Agent, or Firm* — Wenderoth, Lind & Ponack, L.L.P.

(57) ABSTRACT

Playback of backside appearance of an image capture subject at an appropriate playback speed that is in accordance with a predetermined playback time length is achieved by: outputting one recording start point and one recording end point within a period in which a turn motion of the image capture subject is detected; storing a video recording of the turn motion; calculating a recorded time length of at least one specific section of the video; determining a playback speed of the specific section in accordance with the playback time length; and playing back the specific section at the playback speed, whereby the specific section is played back over the playback time length regardless of the recorded time length of the specific section.

9 Claims, 12 Drawing Sheets

(51) Int. Cl.
*H04N 9/82* (2006.01)
*G11B 27/00* (2006.01)
*G11B 27/28* (2006.01)

(56) References Cited

U.S. PATENT DOCUMENTS

2012/0105316 A1   5/2012   Kitamori et al.
2014/0241648 A1*  8/2014   Kunishige ............ H04N 5/232
                                              382/309

FOREIGN PATENT DOCUMENTS

| | | |
|---|---|---|
| JP | 2009-536731 | 10/2009 |
| JP | 4598842 | 12/2010 |
| JP | 2011-234269 | 11/2011 |
| JP | 2011-248714 | 12/2011 |
| WO | 2007/132451 | 11/2007 |
| WO | 2008/126336 | 10/2008 |
| WO | 2009/153975 | 12/2009 |
| WO | 2011/040513 | 4/2011 |

* cited by examiner

IMAGE PROCESSING DEVICE, IMAGE PROCESSING METHOD, AND IMAGE PROCESSING PROGRAM

TECHNICAL FIELD

The present invention relates to image processing technology of delayed display of captured images on a display device

BACKGROUND ART

As of late, a combination of an image capture device, such as a camera, and a display device, such as a monitor, that functions as a digital mirror is being put in practical use. A typical digital mirror is configured such that both the image capture device and the display device face an image capture subject, whereby the digital mirror captures images of the image capture subject and displays the images in real-time.

Patent Literatures 1 and 2 disclose conventional technology that enable checking backside appearance of an image capture subject by using a digital mirror. Patent Literature 1 discloses technology of detecting that a front side/backside of an image capture subject is facing the digital mirror by using face direction detection technology, and thereby automatically recording and playing back backside appearance of the image capture subject. Specifically, Patent Literature 1 discloses technology of recording backside appearance when the image capture subject makes a turn motion (i.e., turns around once) in front of a digital mirror, and playing back the recorded backside appearance. The recording of backside appearance starts when the backside of the image capture subject faces the digital mirror and ends when the front side of the image capture subject faces the digital mirror. This allows the image capture subject to check backside appearance by simply making a turn motion in front of the digital mirror.

Patent Literature 2 discloses technology enabling slow speed playback of captured images. Specifically, Patent Literature 2 discloses technology of switching from performing normal speed playback to performing slow speed playback, or vice versa, when an image capture subject performs a specific gesture during playback of captured images. This allows checking backside appearance even when the image capture subject has made a high speed turn motion.

CITATION LIST

Patent Literature

[Patent Literature 1]
Japanese Patent Application Publication No. 2011-248714
[Patent Literature 2]
International Publication No. 2008/126336

SUMMARY OF INVENTION

Technical Problem

The technology disclosed in Patent Literature 1 displays images of a turn motion performed by an image capture subject at the original speed at which the turn motion is performed. Thus, unfortunately, the speed at which the images are displayed may not be suitable for the checking of backside appearance.

The technology disclosed in Patent Literature 2, when an image capture subject makes a predetermined action, performs slow speed playback at a speed calculated by multiplying the original speed by a fixed value. Unfortunately, the playback speed calculated in such a manner, which for example may be ½ (half) the original speed, may not be suitable for the checking of backside appearance.

The above provides explanation taking as an example a case where an image capture subject is basically a person. Alternatively, an image capture subject may be an object whose backside appearance differs from front-side appearance. Even when the conventional technology described above is applied to such an object, similar problems as described above arise in checking backside appearance of such an object in a turn motion.

The present invention provides a solution to such technical problems, and aims to provide an image processing device that displays, at an appropriate speed, a backside of an image capture subject in a turn motion.

Solution to Problem

In view of the above, the present invention provides, as one aspect thereof, an image processing device including a turn motion detection unit configured to detect a turn motion of an image capture subject and output one recording start point and one recording end point within a period in which the turn motion is detected; a video storing unit configured to store a video recording of the turn motion from the recording start point to the recording end point; a time length calculating unit configured to calculate a recorded time length of at least one specific section of the video recording, the specific section being a section from a first time point in the video recording to a second time point in the video recording; a playback speed determining unit configured to determine a playback speed of the video recording by using the recorded time length and a playback time length, the playback time length being a predetermined time length that is independent from the recorded time length; and a video playback unit configured to play back the specific section at the playback speed. In the image processing device pertaining to one aspect of the present invention, the playback speed determining unit determines the playback speed such that playback of the specific section at the playback speed results in playback being performed for the playback time length.

Advantageous Effects of Invention

The image processing device pertaining to one aspect of the present invention, having the structure described above, achieves displaying, at an appropriate speed, a backside of an image capture subject in a turn motion.

EMBODIMENTS

<How Inventors Arrived at Present Invention>

A digital mirror such as that described above may, for example, be used in apparel stores. A digital mirror located in an apparel store, when capable of displaying backside appearance, is particularly useful when customers at the apparel store try on clothes, for example.

Unfortunately, the technology disclosed in Patent Literature 2 necessitates an image capture subject to determine an appropriate playback speed for checking backside appearance. In specific, should the current playback speed be inappropriate for checking backside appearance, the image capture subject needs to repeatedly play back backside appearance at different playback speeds until specifying an appropriate playback speed for checking backside appearance.

In view of this, the present inventors have arrived at the technical idea of enabling a digital mirror to adaptively adjust playback speed of captured images by receiving preset of a predetermined playback time length over which captured images are to be played back and playing back captured images over the predetermined playback time length. A digital mirror configured in such a manner allows an image capture subject to check backside appearance that is displayed over a suitable predetermined playback time length. Accordingly, for example, when receiving preset of a playback time length suitable for checking backside appearance from a store clerk, etc., the digital mirror plays back backside appearance of an image capture subject at an appropriate speed when the image capture subject makes a turn motion in front of the digital mirror, without necessitating the image capture subject to perform adjustment of playback speed. Further, such a digital mirror can display backside appearance of image capture subjects at an appropriate speed as long as an appropriate playback time length is known to the store clerk, etc., who presets the predetermined playback time length. That is, the store clerk, etc., need not take into consideration the different time lengths of turn motions performed by different image capture subjects and different time lengths of turn motions performed by the same image capture subject at different times when presetting the predetermined playback time length.

Embodiments

The following describes embodiments of the present invention, with reference to the accompanying drawings.

Embodiment 1

Figure 1:
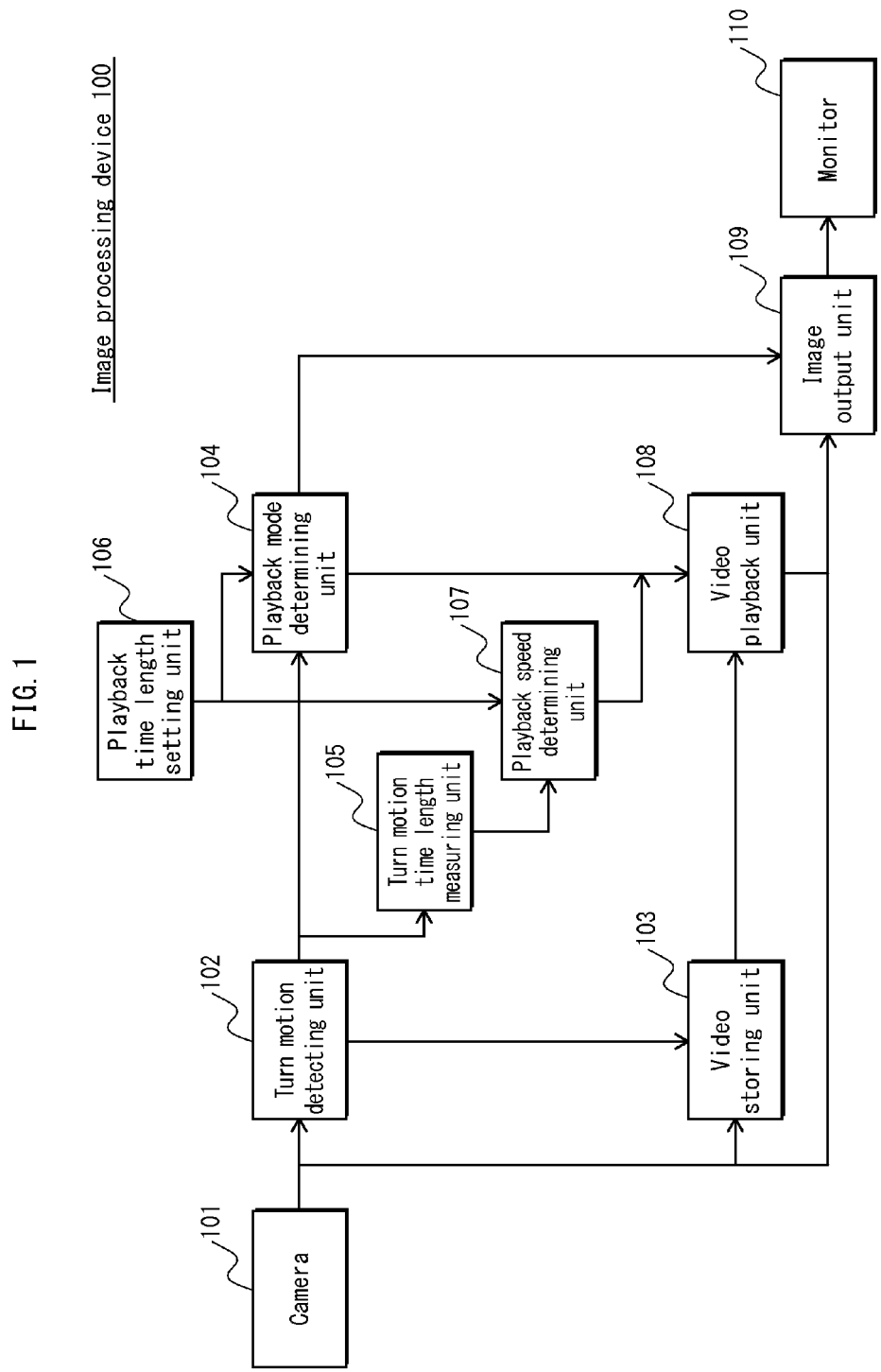
FIG. 1 is a block diagram illustrating image processing device pertaining to embodiment 1.

FIG. 1 is a block diagram illustrating an image processing device 100 pertaining to embodiment 1.

When an image capture subject makes one turn motion in front of the image processing device 100, the image processing device 100 records a video of the turn motion and stores the video. Following the recording and storing of the video, when the image capture subject issues a playback instruction, the image processing device 100 plays back the stored video. Here, the image processing device 100 records the turn motion while the backside of the image capture subject is facing the image processing device 100. Thus, half of the entire turn motion is recorded. The image processing device 100 includes: a camera 101; a turn motion detecting unit 102; a video storing unit 103; a playback mode determining unit 104; a turn motion time length measuring unit 105; a playback time length setting unit 106; a playback speed determining unit 107; a video playback unit 108; an image output unit 109; and a monitor 110.

To simplify explanation in the following, a person who is the image capture subject and who checks his/her backside appearance is referred to as a "user" of the image processing device 100. Further, a person who makes settings for using the image processing device 100, including for example presetting a later-described playback time length, and allows users to use the image processing device 100 is referred to in the following as a "controller" of the image processing device 100. For example, when the image processing device 100 is located in an apparel store, the controller is a store clerk, and the user is a customer trying on clothes at the apparel store.

Figure 2:
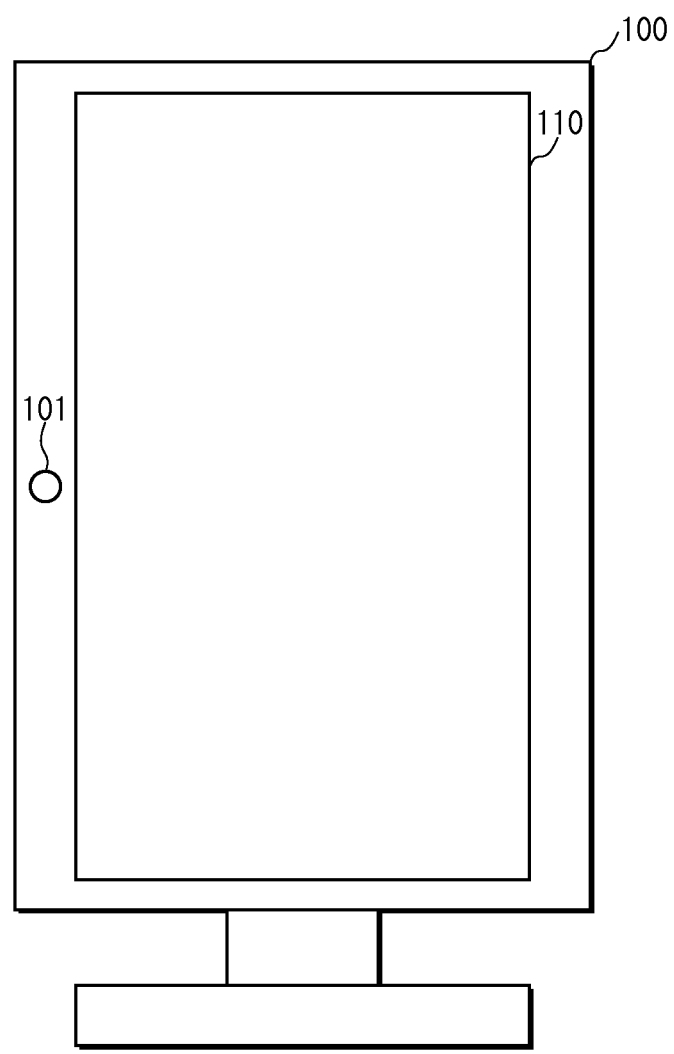
FIG. 2 is a diagram illustrating exterior appearance of image processing device pertaining to embodiment 1.

FIG. 2 illustrates the external appearance of the image processing device 100. As illustrated in FIG. 2, the camera 101 and the monitor 110 are disposed close to one another facing the same direction. The camera 101 and the monitor 110 are disposed to face the user. For example, the image processing device 100 is implemented by using: the camera 101; the video storing unit 103; the playback time length setting unit 106; the monitor 110; a CPU (undepicted); and a memory (undepicted). The memory is implemented by using a non-volatile memory such as an EEPROM, for example. The CPU operates by reading and executing programs stored in the memory, and achieves the functions of the following functional blocks: the turn motion detecting unit 102; the playback mode determining unit 104; the turn motion time length measuring unit 105; the playback speed determining unit 107; the video playback unit 108; and the image output unit 109.

<Explanation of Functional Blocks>

The camera 101 includes: an image capture optical system (undepicted); an image capture element (undepicted); and an A/D converter circuit (undepicted). The image capture optical system includes a focus lens for focus control, and an exposure control unit composed of a shutter and an aperture. The image capture optical system may additionally include a zoom lens for zooming. The image capture element is a photoelectric conversion element implemented by using a CCD sensor or a CMOS sensor. The image capture element captures images of the image capture subject created by the image capture optical system, and outputs image signals. The A/D conversion circuit is a converter converting the image signals (analog signals) output from the image capture element into digital signals. The digital data output from the A/D conversion circuit is output from the camera 101 as captured images or a captured motion picture, which includes captured images.

The monitor 110 is implemented by using a display device such as an LCD (liquid crystal display), a PDP (plasma display panel), or an organic EL panel. The monitor 110 displays images output from the image output unit 109.

The turn motion detecting unit 102 performs face detection and face direction detection. The face detection detects face regions in the captured images output from the camera 101. The face direction detection is performed with respect to each face detected through the face detection and detects a face direction (i.e., a direction that the face is facing). In addition, the turn motion detecting unit 102, when the user makes one turn motion, detects the turn motion in the captured images by using the results of the face direction detection. Further, within a period during which the turn motion is detected, the turn motion detecting unit 102 outputs a recording start point, which is a point at which recording of the turn motion is to be started, and a recording end point, which is a point at which recording of the turn motion is to be ended. Here, the turn motion detecting unit 102 performs the face direction detection by using, for example, conventional technology such as that disclosed in Japanese Patent Application Publication No. 2011-234269. Japanese Patent Application Publication No. 2011-234269 discloses a technology of detecting chronological changes in eye/nose shading and face outline.

Figure 3:
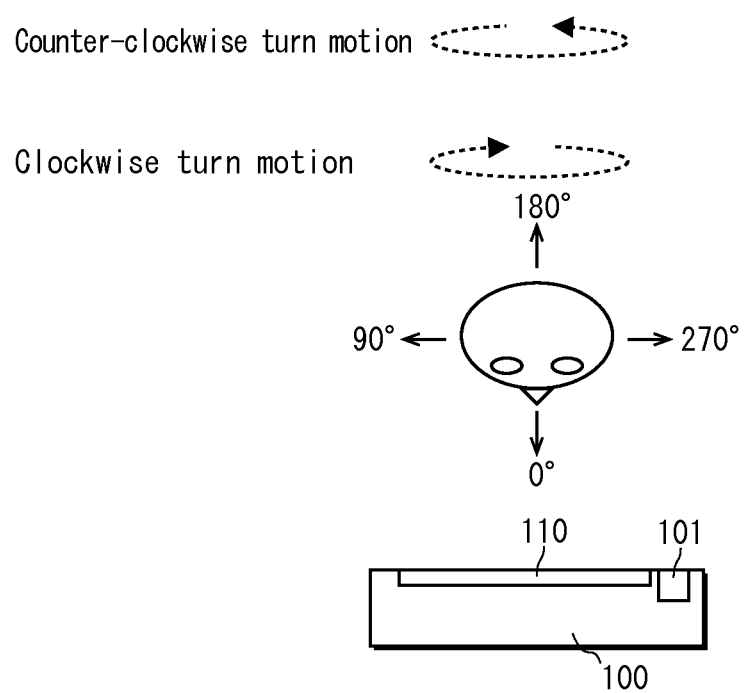
FIG. 3 is a diagram illustrating directions of turn motion of image capture subject.

The following explains face directions, with reference to FIG. 3. FIG. 3 illustrates the user and the image processing device 100 when seen from directly above. In the following, the face direction when the user is facing the front (i.e., facing the image processing device 100) is referred to as face direction 0°. The direction that the image capture subject is facing is expressed by using angles indicating the amount of rotation of the user from face direction 0° in a clockwise turn motion. For example, the face direction when the user has turned to the right (when the left side of the user's face is facing the image processing device 100) is referred to as face direction 90°, the face direction when the user has turned away from the image processing device 100 (when the back of the user's head is facing the image processing device 100) is referred to as face direction 180°, and the face direction when the user has turned to the left (when the right side of the user's face is facing the image processing device 100) is referred to as face direction 270°.

As already described above, the image processing device 100 pertaining to the present embodiment records and stores a video of the turn motion that the user makes while the backside of the user is facing the image processing device 100. That is, the image processing device 100 records the turn motion that the user makes while the face direction of the user is within a range between face direction 90° and face direction 270°. To make this possible, the turn motion detecting unit 102 detects the recording start point when detecting face direction 90°, and detects the recording end point when detecting face direction 270°. As can be seen from the above, the image processing device 100 does not record the turn motion that the user makes while the front side of the user is facing the image processing device 100. That is, when taking a case where a user makes a clockwise turn motion as an example, the image processing device 100 does not record the turn motion during a period between from when face direction 0° is initially detected until when face direction 90° is detected, and a period from when face direction 270° is detected until when face direction 0° is detected once again. This is because while the front side of a user is facing the image processing device 100, the user is able to visually recognize oneself even if the image processing device 100 is simply operating as a mirror.

The following explains how the turn motion detecting unit 102 detects the turn motion and detects the recording start point and the recording end point, based on an example where the user makes a clockwise turn motion. First, the turn motion detecting unit 102 performs face direction detection and detects face direction 0°. When subsequently detecting face direction 90°, the turn motion detecting unit 102 outputs the recording start point. Further, when subsequently detecting face direction 270°, the turn motion detecting unit 102 outputs the recording end point. Following this, the turn motion detecting unit 102 detects face direction 0° once again when the image capture subject faces the front once again. The image processing device 100 records the clockwise turn motion starting from the recording start point and the recording end point. Thus, the video recording of the turning motion corresponds to a part of the clockwise turn motion during which the user's backside is facing the image processing device 100 (the part of the clockwise turn motion from face direction 90° to face direction 270°).

Note that when the user makes a counter-clockwise turn motion, face direction 0° (user facing the front), face direction 270° (user has turned to the left), and face direction 90° (user has turned away from the image processing device 100) are detected in the stated order before face direction 0° (user facing the front) is detected once again. Thus, when the user makes a counter-clockwise turn motion, the turn motion detecting unit 102 detects the recording start point when detecting face direction 270°, and detects the recording end point when detecting face direction 90°. Accordingly, the video recording of the counter-clockwise turn motion, which is recorded starting from the recording start point and ending at the recording end point, corresponds to a part of the counter-clockwise turn motion during which the user's backside is facing the image processing device 100 (the part of the counter-clockwise turn motion from face direction 270° to face direction 90°).

The video storing unit 103 receives the captured images from the camera 101. Further, the video storing unit 103 receives the recording start point and the recording end point from the turn motion detecting unit 102. The video storing unit 103 starts recording, as a video, the captured motion picture input from the camera 101 when receiving the recording start point, and stops recording, as a video, the captured motion picture input from the camera 101 when receiving the recording end point. The video storing unit 103 is implemented by using, for example, a hard disk drive or a SSD (solid state disk).

The playback mode determining unit 104 receives, from the turn motion detecting unit 102, the recording start point, the recording end point, and playback start information. The playback mode determining unit 104 determines an operation mode that the image processing device 100 should be in. Further, when determining that switching from one operation mode to another operation mode is necessary, the playback mode determining unit 104 transmits an instruction for realizing the latter operation mode to the video playback unit 108 and the image output unit 109. As described in detail later in the present disclosure, the image processing device 100 has two operation modes, one being a mirror mode and the other being a backside appearance playback mode. Different images are displayed on the monitor 110 in the two operation modes. The playback start information is an instruction for causing the image processing device 100 to start playback of backside appearance. In the present embodiment, the turn motion detecting unit 102 outputs the playback start information to the playback mode determining unit 104 when detecting face detection 0° once again following the recording end point.

The following explains how the playback mode determining unit 104 determines the operation mode that the image processing device 100 should operate in. The playback mode determining unit 104, until obtaining the playback start information, determines that the image processing device 100 should operate in the mirror mode. When operating in the mirror mode, the image processing device 100 performs real-time display of the captured images output from the camera 101 on the monitor 110. The playback mode determining unit 104, when obtaining the playback start information after obtaining the recording start point and the recording end point in the stated order, determines that the image processing device 100 should operate in the backside appearance playback mode. When operating in the backside appearance playback mode, the image processing device 100 plays back the video stored in the video storing unit 103 and displays the video on the monitor 110. When the playback time length set to the playback time length setting unit 106 elapses after determining that the image processing device 100 should operate in the backside appearance playback mode, the playback mode determination unit 104 determines that the image processing device 100 should operate in the mirror mode.

The turn motion time length measuring unit 105 obtains the recording start point and the recording end point from the turn motion detecting unit 102, and measures a time length between the recording start point and the recording end point. In specific, the turn motion time length measuring unit 105 starts measuring time when obtaining the recording start point, and stops measuring time when obtaining the recording end point. The turn motion time length measuring unit 105 outputs the time length so measured to the playback time length setting unit 106. Note that in the present disclosure, the term "specific section" is used to indicate a section of a stored video that is actually played back in the playback of backside appearance. In the present embodiment, as already described above, the video stored in the video storing unit 103 and played back in the playback of backside appearance corresponds to half the turn motion that the user has made. Thus, in the present embodiment, the specific section is the entirety of the video stored in the video storing unit 103, recorded starting from the recording start point and ending at the recording end point. Further, in the present disclosure, the term "recorded time length" is used to indicate a time length of the specific section. Thus, in the present embodiment, the time length measured by the turn motion time length measurement unit 105 corresponds to the recorded time length of the specific section.

The playback time length setting unit 106 holds the playback time length, which is the time length over which the specific section of the video stored in the video storing unit 103 is to be played back and displayed. The playback time length is a fixed time length that is appropriate for playing back backside appearance, and is preset by the controller of the image processing device 100. For example, the playback time length may be 10 seconds, 15 seconds, or 17.5 seconds. For example, the playback time length setting unit 106 may be implemented by using a non-volatile memory, such as an EEPROM, for holding the playback time length and a human interface, such as a touch panel, via which the setting of the playback time length is performed.

The playback speed determining unit 107 calculates a playback speed of the video stored in the video storing unit 103 by using the playback time length and the recorded time length of the specific section. When denoting the playback time length as Tp and denoting the recorded time length as Tr, the playback speed determining unit 107 calculates a playback speed ratio R using the following expression.

[Math 1]

$$R = \frac{Tr}{Tp} \quad \text{(Expression 1)}$$

The playback speed ratio R is a ratio of the playback speed of the video stored in the video storing unit 103 to a standard speed. In the present disclosure, a standard speed, which is also referred to by using the term "recording speed", is a speed at which playback of the video is performed when recorded time length and playback time length are equal. When the video is played back according to the playback speed ratio R, the video is played back at R times the recording speed. For example, when Tp=Tr, the recorded time length and the playback time length are equal, and thus, R=1.0. Thus, the playback speed is equal to (i.e., is 1.0 times) the recording speed. Meanwhile, playback at a slower speed than the recording speed (i.e., slow speed playback) is performed when R<1.0, whereas playback at a higher speed than the recording speed (i.e., high speed playback) is performed when R>1.0.

The video playback unit 108, when receiving the instruction for switching to the backside appearance playback mode from the playback mode determining unit 104, plays back the video stored in the video storing unit 103 according to the playback speed ratio R and outputs the result of the playback to the image output unit 109. The following provides explanation on how the video playback unit 109 performs slow speed playback and high speed playback. The video playback unit 108, when performing slow speed playback of a video, outputs each frame of the video at least twice, thereby obtaining a 1/R number of frames. For example, when R=0.5, the video playback unit 108 outputs each frame in the video twice. Meanwhile, the video playback unit 108, when performing high speed playback of the video, only outputs a certain number of frames among the entire number of frames in the video, thereby obtaining a 1/R number of frames. For example, when R=2.0, the video playback unit 108 outputs every other one of the frames in the video.

The image output unit 109, when receiving the instruction for switching to the backside appearance playback mode from the playback mode determining unit 104, starts to output to the monitor 110 images differing from images output in the mirror mode. In specific, when the image processing device 100 is in the mirror mode, the image output unit 109 outputs, to the monitor 110, the captured images input from the camera 101 as-is. In contrast, when the image processing device 100 is in the backside appearance playback mode, the image output unit 109 outputs, to the monitor 110, images obtained by the video playback unit 108 playing back the video stored in the video storing unit 103.

<Operations>

Figure 4:
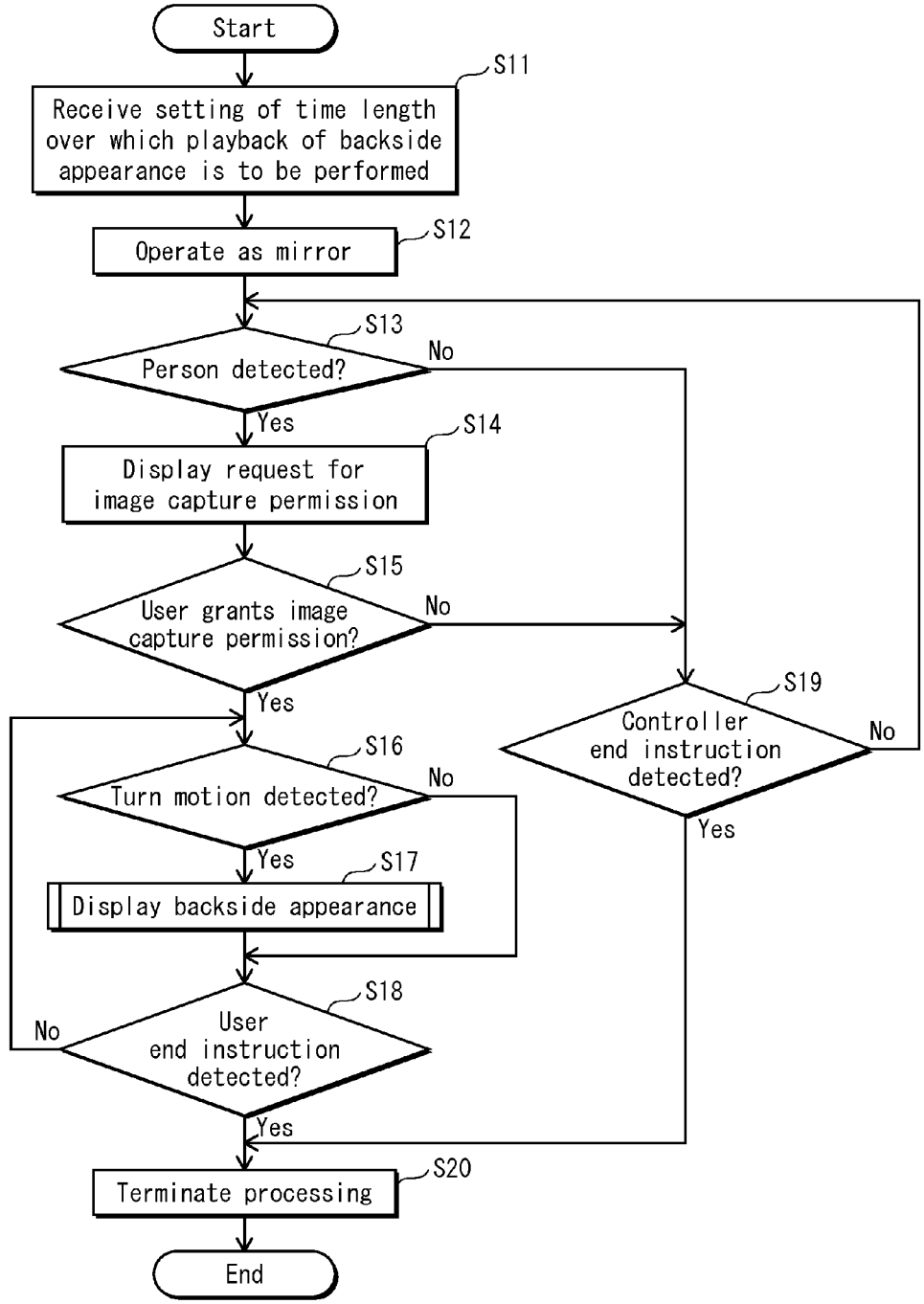
FIG. 4 is a flowchart illustrating operations of image processing device pertaining to embodiment 1.

FIG. 4 is a flowchart illustrating the operations of the image processing device 100. The following explains the operations of the image processing device 100 one by one, with reference to FIG. 4.

First, the playback time length setting unit 106 receives setting of the playback time length Tp, which is the time length over which playback of backside appearance is to be performed (S11). For example, this may be performed by the controller of the image processing device 100 setting, to the playback time length setting unit 106, a time length that is appropriate for the checking of backside appearance. For example, the controller of the image processing device 100 may set 10 seconds as the playback time length Tp.

From this point, the image processing device 100 operates in the mirror mode (S12). In specific, the playback mode determination unit 104 determines that the image processing device 100 should operate in the mirror mode, and the image output unit 109 outputs the captured motion picture output from the camera 101 as-is to the monitor 110. Thus, the monitor 110 displays in real-time the captured images from the camera 101.

Subsequently, the image processing device 100 performs face detection and determines whether or not a person is present in front of the image processing device 100 (S13). When no one is detected in front of the image processing device 100 as a result of face detection ("No" in S13), the image processing device 100 determines whether or not a later-described controller end instruction is input (S19). When the controller end instruction is not detected ("No" in S19), the image processing device 100 performs the face direction once again to determine whether or not a person is present in front of the image processing device 100 (S13).

On the other hand, when a person is detected in front of the image processing device 100 as a result of face detection ("Yes" in Step S13), the image processing device 100 performs the following operations. The image processing device 100 displays a screen notifying the user, who is the person detected in S13, of video recording of the motion picture being captured, thereby asking the user for permission of video recording (S14). This process is incorporated because video recording without the user's permission is undesirable for protecting the user's privacy. In specific, in S14, the image processing device 100 displays a screen urging the user to perform a predetermined gesture if agreeing with video recording. Subsequently, the image processing device 100 detects whether or not the user's permission has been granted (S15). In specific, the image processing device 100 detects whether or not the predetermined gesture is performed by the user. When the user's permission is not granted ("No" in S15), the image processing device 100 determines whether or not the controller end instruction is input (S19), similar to when no one is detected in S13. When the controller end instruction is not detected ("No" in S19), the image processing device 100 performs face detection once again to determine whether or not a person is present in front of the image processing device 100 (S13). For example, the user's permission is not granted in S15 in the following cases: (i) when the predetermined gesture indicating permission for video recording is not detected within a predetermined time; (ii) when the user has left from the front of the image processing device 100 and is no longer detected; and (iii) when a gesture made by the user indicating refusal to agree with video recording has been detected. Note that a modification may be made such that the image processing device 100, in determining whether or not a person is present in front of the image processing device 100 in S13 once again following refusal by the user to agree with video recording, determines that no one is present until the user, who has refused to agree with video recording, leaves and is no longer detected. When making such a modification, a user who refuses to agree with video recording can use the image processing device 100 as an ordinary mirror. Further, when making such a modification, if a user once having refused to agree with video recording should later feel inclined to agree with video recording to check backside appearance, the user can return to the front of the image processing device 100 after leaving the front of the image processing device 100.

When the user's permission for video recording is granted ("Yes" in S15), the image processing device 100 detects a turn motion of the user via the turn motion detecting unit 102 (S16). When the user does not make a turn motion and remains facing the image processing device 100 ("No" in S16), the image processing device 100 does not detect a turn motion because face direction of the user's face remains around face direction 0°. In such a case, the playback mode determining unit 104 determines that switching to the backside appearance playback mode is unnecessary, and the image processing device 100 remains in the mirror mode. Subsequently, the image processing device 100 detects whether or not a later-described user end instruction is made (S18). When not detecting the user end instruction ("No" in S18), the image processing device 100 returns to S16 once again to detect a turn motion.

On the other hand, when the user makes a turn motion ("Yes" in S16), the image processing device 100 records and stores a video of the turn motion starting from the recording start point and ending at the recording end point, and performs delayed playback of the specific section of the video to play back backside appearance (S17).

Figure 5A:
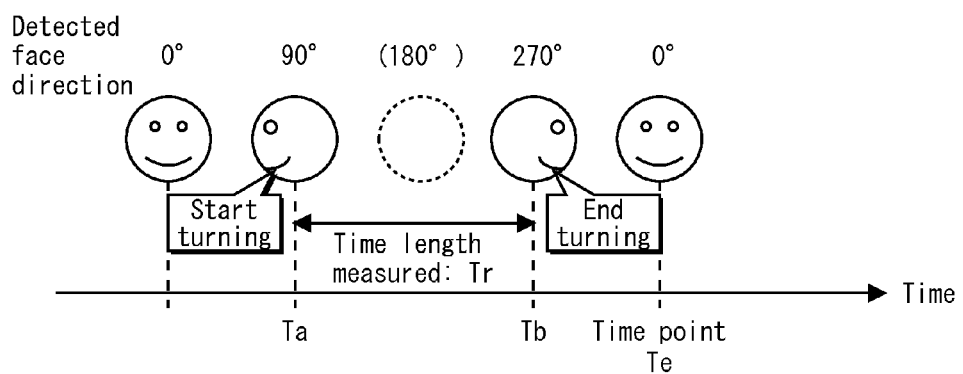
FIGS. 5A and 5B are diagram illustrating relationship between results of face direction detection and time.
Figure 5B:
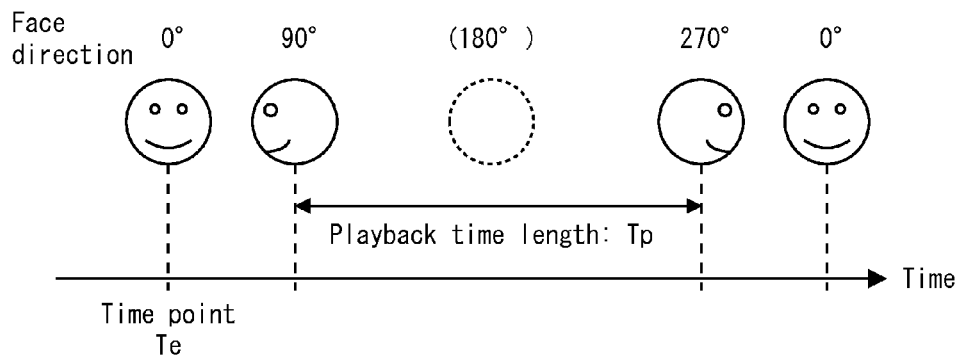
Figure 6:
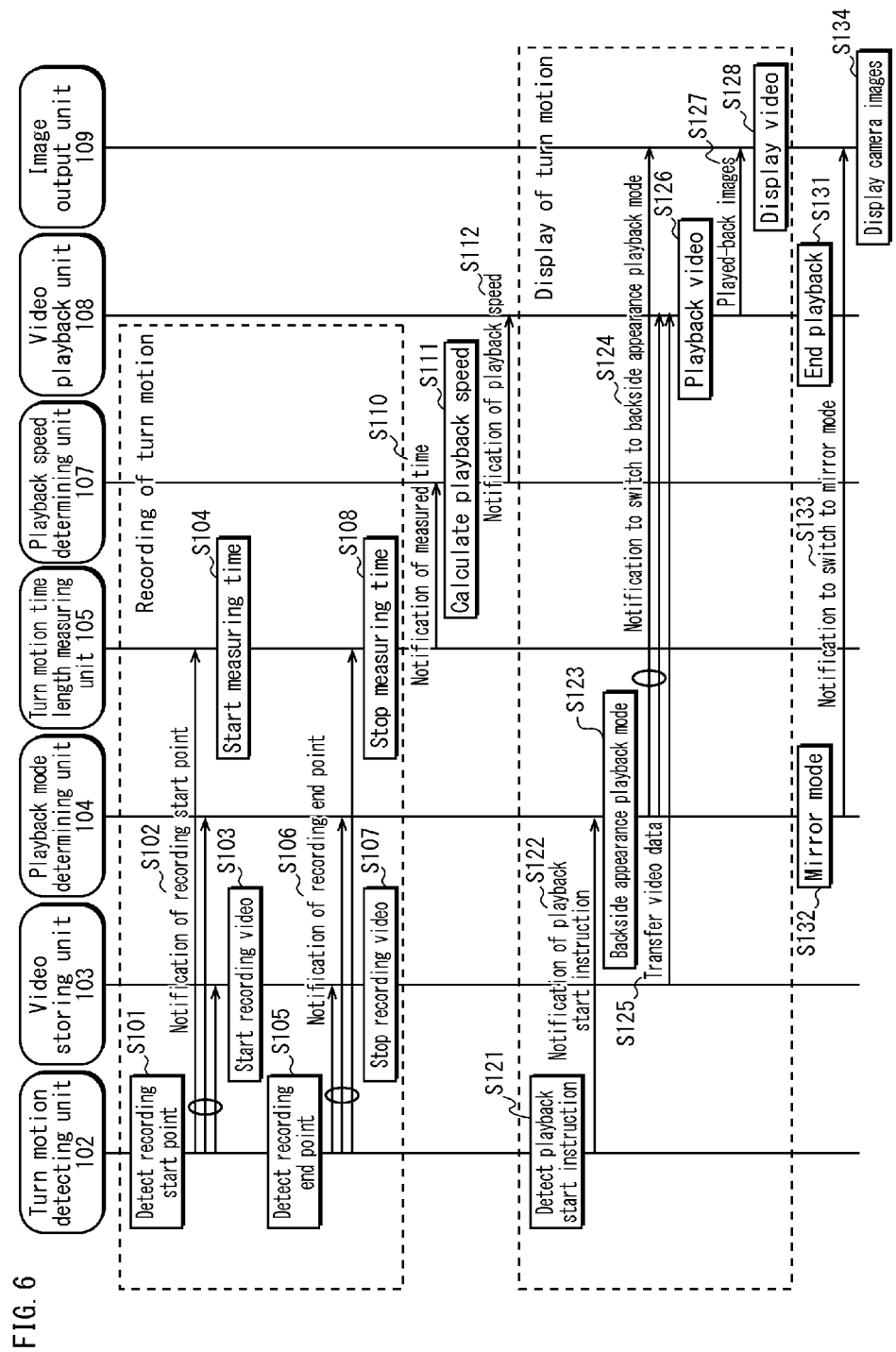
FIG. 6 is a sequential diagram illustrating operations of image processing device pertaining to embodiment 1 in playback of backside appearance.

The following explains the playback of backside appearance in S17, with reference to FIGS. 5A and 5B, and FIG. 6. FIGS. 5A and 5B illustrate the relationship between time and face directions in a case where the user makes a clockwise turn motion. FIG. 6 is a sequential diagram illustrating details of the processing in S17.

FIG. 5A is a diagram illustrating face directions in video recording. The turn motion detecting unit 102 detects face direction 0°, face direction 90°, and face direction 270° in the stated order before detecting face direction 0° once again. The turn motion detecting unit 102, when detecting face direction 90° at time point Ta (S101), outputs a notification of the recording start point (S102). Subsequently, the turn motion detecting unit 102, when detecting face direction 270° at time point Tb (S105), outputs a notification of the recording end point (S106). Following this, the turn motion detecting unit 102, when detecting face direction 0° once again at time point Te (S121), outputs the playback start information (S122).

The video storing unit 103 starts storing, as a video, the captured motion picture from the camera 101 when receiving the recording start point from the turn motion detecting unit 102 (S103), and stops, storing as a video, the captured motion picture from the camera 101 when receiving the recording end point from the turn motion detecting unit 102 (S107). Such processing results in the video storing unit 103 storing a video of the motion picture captured by the camera 101 between time points Ta and Tb.

The turn motion time length measuring unit 105 starts measuring time when receiving the notification of recording start point from the turn motion detecting unit 102 (S104), and stops measuring time when receiving the notification of the recording end point from the turn motion detecting unit 102 (S108). The turn motion time length measuring unit 105 outputs the time length so measured to the playback speed determining unit 107 (S110). Such processing results in the playback speed determining unit 107 receiving, as the recording time of the specific section, a time length Tr between time points Ta and Tb.

The playback speed determining unit 107 calculates the playback speed ratio R according to Expression 1 above, by using the recorded time length Tr obtained from the turn motion time length measuring unit 105 and the playback time length Tp obtained from the playback time length setting unit 106 (S111). Subsequently, the playback speed determining unit 107 outputs the playback speed ratio R so calculated to the video playback unit 108 (S112). For example, when the recorded time length Tr is 8 seconds and the playback time length Tp is 10 seconds, the playback speed ratio R equals 0.8.

The playback mode determining unit 104, when obtaining the playback start information from the turn motion detecting unit 102 after obtaining the recording start point and the recording end point from the turn motion detecting unit 102, determines that the operation mode of the image processing device 100 is to be switched to the backside appearance playback mode (S123). When making this determination, the playback mode determining unit 104 notifies the video playback unit 108 and the image output unit 109 that the operation mode of the image processing device 100 is to be switched to the backside appearance playback mode (S124).

The video playback unit 108, when receiving the notification in S124, reads out the video of the turn motion from the video storing unit 103 (S125) and plays back the video in accordance with the playback speed ratio R specified by the playback speed determining unit 107 (S126). The image output unit 109, when receiving the notification in S124, suspends the real-time output of the captured motion video from the camera 101, and outputs the video output by the video playback unit 108 to the monitor 110 (S127).

Such operations result in the backside appearance of the user during one turn motion, which is stored as a video, being played back and displayed on the monitor 110 over the preset playback time length Tp, starting from when the user faces the front after completing the turn motion. When taking a case where the playback time length Tp is set to 10 seconds as an example, (i) when the recorded time length Tr=8 seconds, the backside appearance of the user during the turn motion is displayed on the monitor 110 over the 10 second playback time length at 0.8 times the recording speed, and (ii) when the recorded time length Tr=13 seconds, the backside appearance of the user during the turn motion is displayed on the monitor 110 over the 10 second playback time length at 1.3 times the recording speed. FIG. 5B illustrates face directions in playback.

Note that when the user makes a counter-clockwise turn motion, the turn motion detecting unit 102 detects face direction 0°, face direction 270°, and face direction 90° in the stated order before detecting face direction 0° once again. As such, to play back backside appearance of the user during the counter-clockwise turn motion, it suffices for the image processing device 100 to detect the recording start point when detecting face direction 270° and to detect the recording end point when detecting face direction 90°, while performing rest of the operations in a similar manner as described above.

When playback is completed (S131), the playback mode determining unit 104 determines that the operation mode of the image processing device 100 is to be switched to the mirror mode (S132). When making this determination, the playback mode determining unit 104 notifies the image output unit 109 that the operation mode of the image processing device 100 is to be switched to the mirror mode (S133). Following this point, the image output unit 109 outputs the captured motion picture from the camera 101 as-is to the monitor 110 (S134). Here, note that the playback mode determining unit 104 performs the operation in S132 when the playback time length Tp elapses from S124 as already described above in the explanation of the functional blocks, without receiving a notification that playback has been completed in S131. This is because the time required for S126 is Tp, and thus, a time point later than S124 by the playback time length Tp and the time point of S131 coincide.

The following describes the operations following S17, by referring to FIG. 4 once again. The image processing device 100 detects whether or not the user end instruction is made (S18). When the user end instruction is not detected ("No" in S18), the image processing device 100 returns to S16. The image processing device 100, when detecting another turn motion made by the user in S16, performs playback of backside appearance again. Note that when already storing a video of a turn motion but having to store a video of another turn motion due to S17 being performed again, the image storing unit 103 may store the new video by discarding the older video or by overwriting the older video with the new video, provided that the older video is no longer necessary.

On the other hand, the image processing device 100, when detecting the user end instruction ("Yes" in S18), terminates processing (S20). The user end instruction may be issued, for example, when the user leaves the front of the image processing device 100.

The image processing device 100 also terminates processing (S20) when the controller end instruction is detected ("Yes" in S19) after no one is detected in front of the image processing device 100 ("No" in S13) or after the user's permission for video recording is not granted ("No" in S15). The controller end instruction may be issued, for example, when the controller of the image processing device 100 makes a predetermined gesture.

The following describes in detail processing that the image processing device 100 executes when terminating processing in S20. The image processing device 100 deletes the video stored in the video storing unit 103. The deletion of the video may be performed, for example, by overwriting the entirety of a storage area occupied by the video by using a specific type of data (e.g., "0"). Following the deletion of the video, the image processing device 100 displays, on the monitor 110, a message notifying the user of deletion of video. Through displaying such a message, a clear notification is made to the user that data related to the user stored in the image processing device 100 has been discarded, which provides the user with the feeling that the image processing device 100 is reliable in terms of privacy.

Note that when the playback mode determining unit 104 obtains the recording end point and subsequently obtains another recording start point without obtaining the playback start information, the image processing device 100 discards the video stored in the video storing unit 103 and executes the processing in S17 once again starting from S101. In such a case, the video storing unit 103 may store a new video resulting from processing in S17 by discarding the video currently stored therein while providing a clear notification to that effect to the user, or by overwriting the older video with the new video.

Note that when the playback mode determining unit 104 does not obtain the playback start information within a predetermined amount of time from the acquisition of the recording end point, the image processing device 100 terminates processing in S20 regarding that the user end instruction has been made, although the user end instruction has not actually been made in this case.

<Conclusion>

The image processing device pertaining to the present embodiment, provided with the above structure, achieves appropriately adjusting playback speed applied when performing delayed playback of video of a turn motion made by a person to allow the person to check backside appearance. Accordingly, the image processing device pertaining to the present embodiment enhances convenience in checking backside appearance.

Embodiment 2

Figure 7:
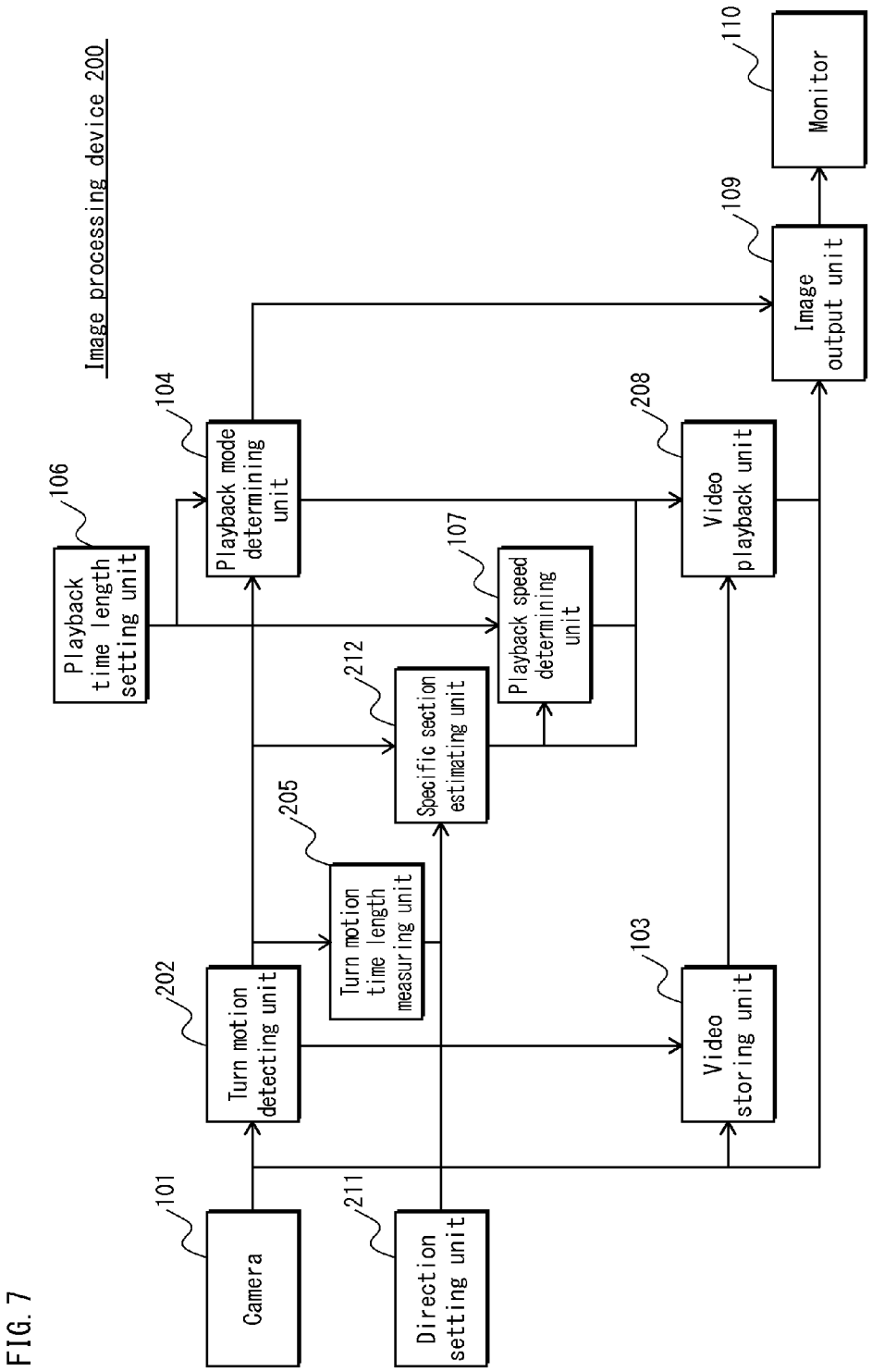
FIG. 7 is a block diagram illustrating image processing device pertaining to embodiment 2.

FIG. 7 is a block diagram illustrating an image processing device 200 pertaining to embodiment 2. In FIG. 7, elements already illustrated in FIG. 1 are labeled with the same reference signs. Further, explanation on such elements is not provided in the following.

Embodiment 2 is characterized in that the image processing device 200 only plays back a particular section corresponding to a preset range of face directions as the specific section. As already defined above, in the present disclosure, the specific section is a section that is actually played back in the playback of backside appearance of the video stored in the video storing unit 103.

The image processing device 200 includes: the camera 101; a turn motion detecting unit 202; the video storing unit 103; the playback mode determining unit 104; a turn motion time length measuring unit 205; the playback time length setting unit 106; the playback speed determining unit 107; a direction setting unit 211; a specific section estimating unit 212; a video playback unit 208; the image output unit 109; and the monitor 110.

<Explanation of Functional Blocks>

The turn motion detecting unit 202 performs the operations of the turn motion detecting unit 102. In addition, the turn motion detecting unit 202 outputs, to the specific section estimating unit 212, face directions of the user at the recording start point and the recording end point. These face directions are used for the estimation of the specific section in the present embodiment, explanation on which is provided later in the present disclosure.

The turn motion time length measuring unit 205 performs the same operations as the turn motion time length measuring unit 105. The only difference between the turn motion time length measuring unit 205 and the turn motion time length measuring unit 105 is that the turn motion time length measuring unit 205 outputs the time length that it measures to the specific section estimating unit 212.

The direction setting unit 211 obtains, from the controller of the image processing device 200, user face directions for specifying the specific section of the video recording of the turn motion, which is stored in the video storing unit 103. The direction setting unit 211 sets the user face directions so obtained to the specific section estimating unit 212. As already described above, in the present disclosure, the specific section is a section of a video recording of a turn motion that is actually played back in the playback of backside appearance. In the present embodiment, the controller of the image processing device 200 specifies a face direction range of a part of a turn motion that is to be used in playback of backside appearance, wherefrom the specific section can be specified. For example, the controller of the image processing device 200 may specify a turn motion part corresponding to a face direction range between face direction 150° and face direction 210° as the turn motion part to be used in playback of backside appearance. In such a case, the controller of the image processing device 200 sets face direction 150° and face direction 210°, which correspond to a start point and an end point of the turn motion part to be used in playback of backside appearance, respectively, to the direction setting unit 211. For example, the direction setting unit 211 may be implemented by using a non-volatile memory, such as an EEPROM, for holding the face directions corresponding to the start point and end point of the turn motion part to be used in playback of backside appearance, and a human interface, such as a touch panel, via which the setting of the face directions corresponding to the start point and the end point of the turn motion part to be used in playback of backside appearance is performed.

The specific section estimating unit 212 obtains, from the turn motion detecting unit 202, timing information of the recording start point, timing information of the recording end point, and user face directions at the recording start point and the recording end point. Further, the specific section estimating unit 212 obtains, from the face direction setting unit 211, face directions corresponding to the start point and the end point of the turn motion part to be used in playback of backside appearance. In addition, the specific section estimating unit 212 obtains, from the turn motion time length measuring unit 205, the time length from the recording start point to the recording end point. Further, the specific section estimating unit 211 estimates a start point of the specific section (referred to as a "playback start point" in the following) and an end point of the specific section (referred to as a "playback end point" in the following). Further, the specific section estimating unit 211 outputs timing information of the playback start point and timing information of the playback end point to the video playback unit 208, and outputs the recorded time length of the specific section to the playback speed determining unit 107.

Figure 8:
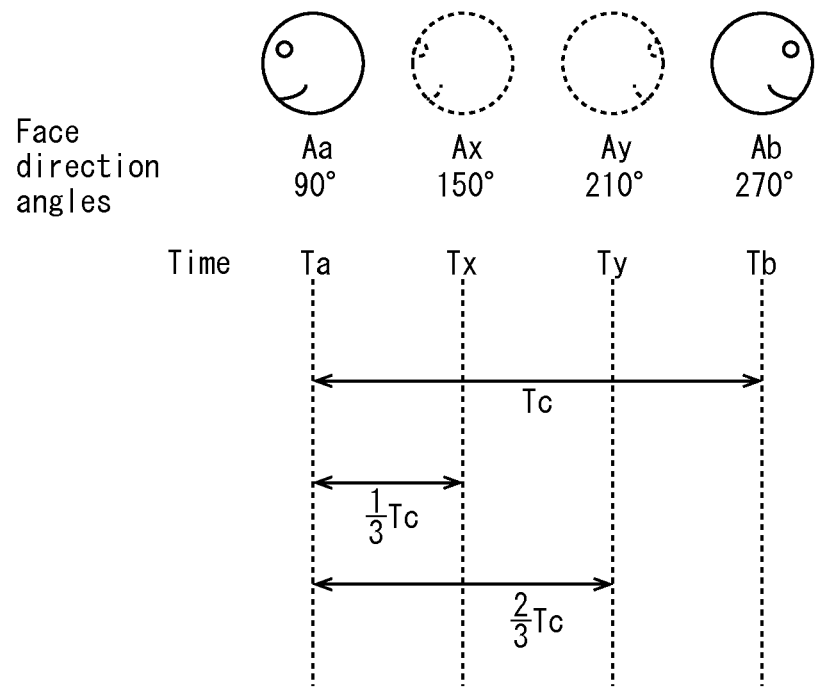
FIG. 8 illustrates relationship between preset face directions angles and recorded time length.

The following explains how the playback start point, the playback end point, and the recorded time length of the specific section are estimated, with reference to FIG. 8. The specific section estimating unit 212 assumes that the user turns at a constant speed during the turn motion, and based on this assumption, estimates the playback start point and the playback end point of the specific section of the video stored in the video storing unit 103 by using the face directions at the start point and the end point of the turn motion part to be used in playback of backside appearance. When (i) denoting the time point of the recording start point as Ta, the time point of the recording end point as Tb, the time point of the start point of the turn motion part to be used in playback of backside appearance as Tx, and the time point of the end point of the turn motion part to be used in playback of backside appearance as Ty, (ii) denoting user face directions at time points Ta, Tx, Ty, Tb as Aa, Ax, Ay, Ab (each indicating angle (°)), respectively, and (iii) denoting the time length between the recording start point Ta and the recording end point Tb as Tc, a time length Tx−Ta between the recording start point and the playback start point is calculated as Ts in the following expression.

[Math 2]

$$Ts = Tc \times \frac{Ax - Aa}{Ab - Aa} \qquad \text{(Expression 2)}$$

Note that similarly, a time length Ty−Ta between the recording start point and the playback end point can be calculated as Ts in the above expression by substituting Ay for Ax in the expression. For example, when Aa=90°, Ab=270°, and Ax=150°, Tx (playback starting point) is a time point later than Ta (recording start point) by a time length Tc×⅓=Tc×(150−90)/(270−90). Similarly, when Aa=90°, Ab=270°, and Ay=210°, Ty (playback end point) is a time point later than Ta (recording start point) by a time length Tc×⅔=Tc×(210−90)/(270−90).

Further, time ratio information Rp indicating the ratio of the recorded time length (Ty−Tx) of the specific section to the time length from recording start point Ta to recording end point Tb is calculated through the following expression.

[Math 3]

$$Rp = \frac{Ay - Ax}{Ab - Aa} \qquad \text{(Expression 3)}$$

For example, when Aa=90°, Ab=270°, Ax=150°, and Ay=210°, Rp=(210−150)/(270−90)=⅓. That is, in this example, the specific section estimating unit 212 outputs, to the playback speed determining unit 107, a value Tc/3 as the recorded time length Tr of the specific section. The value Tc/3 is obtained by multiplying Tc (time length obtained from the turn motion time length measuring unit 205) by Rp.

The video playback unit 208 obtains the timing information of the playback start point and the playback end point from the specific section estimating unit 212, as already described above. When the playback mode determining unit 104 determines that the playback mode of the image processing device 200 is to be switched to the backside appearance playback mode, the image playback unit 208 obtains the video of the turn motion that is stored in the video storing unit 103, and plays back the specific section of the video, which is the section from the playback start point to the playback end point.

<Operations>

Figure 9:
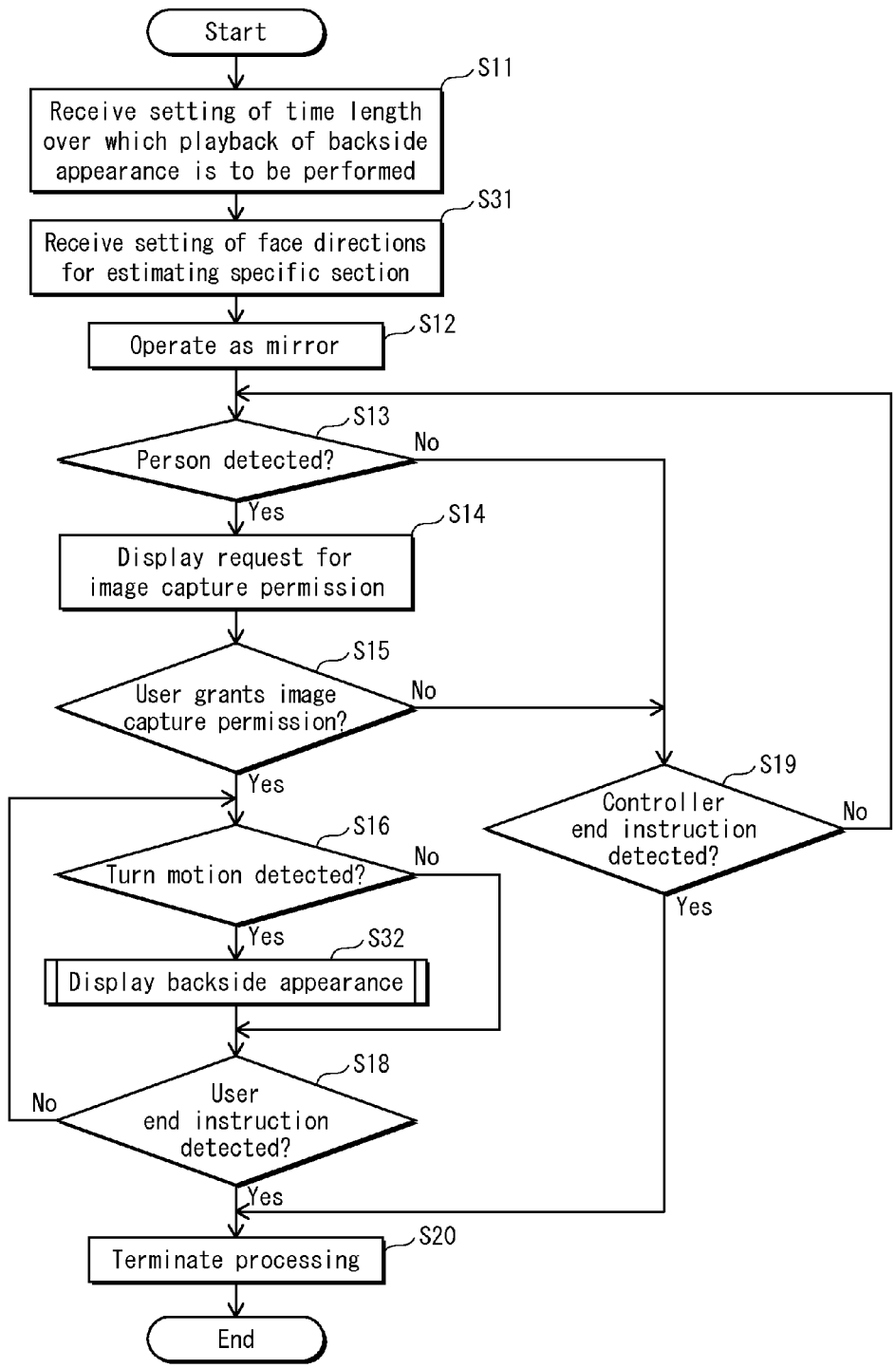
FIG. 9 is a flowchart illustrating operations of image processing device pertaining to embodiment 2.

FIG. 9 is a flowchart illustrating the operations of the image processing device 200. The following explains the operations of the image processing device 200 one by one, with reference to FIG. 9. In FIG. 9, operations already illustrated in FIG. 4 are indicated by using the same reference signs (step numbers). Further, explanation on such operations is not provided in the following.

First, the playback time length setting unit 106 receives setting of the playback time length, which is the time length over which playback of backside appearance is to be performed (S11).

Subsequently, the direction setting unit 211 receives setting of the face directions at the start point and the end point of the turn motion part to be used in playback of backside appearance (S31). In the following, explanation is provided based on an example where the direction setting unit 211 has received face direction 150° and face direction 210° as the face directions at the start point and the end point of the turn motion part to be used in playback of backside appearance, respectively.

Subsequently, the image processing device 200 performs face detection and determines whether or not a person is present in front of the image processing device 100 (S12). The operations of the image processing device 200 following this point, other than the operations in the playback of backside appearance (S32), are similar to those of the image processing device 100. Thus, the following does not explain such similar operations, but focuses on explaining the playback of backside appearance in S32.

Figure 10:
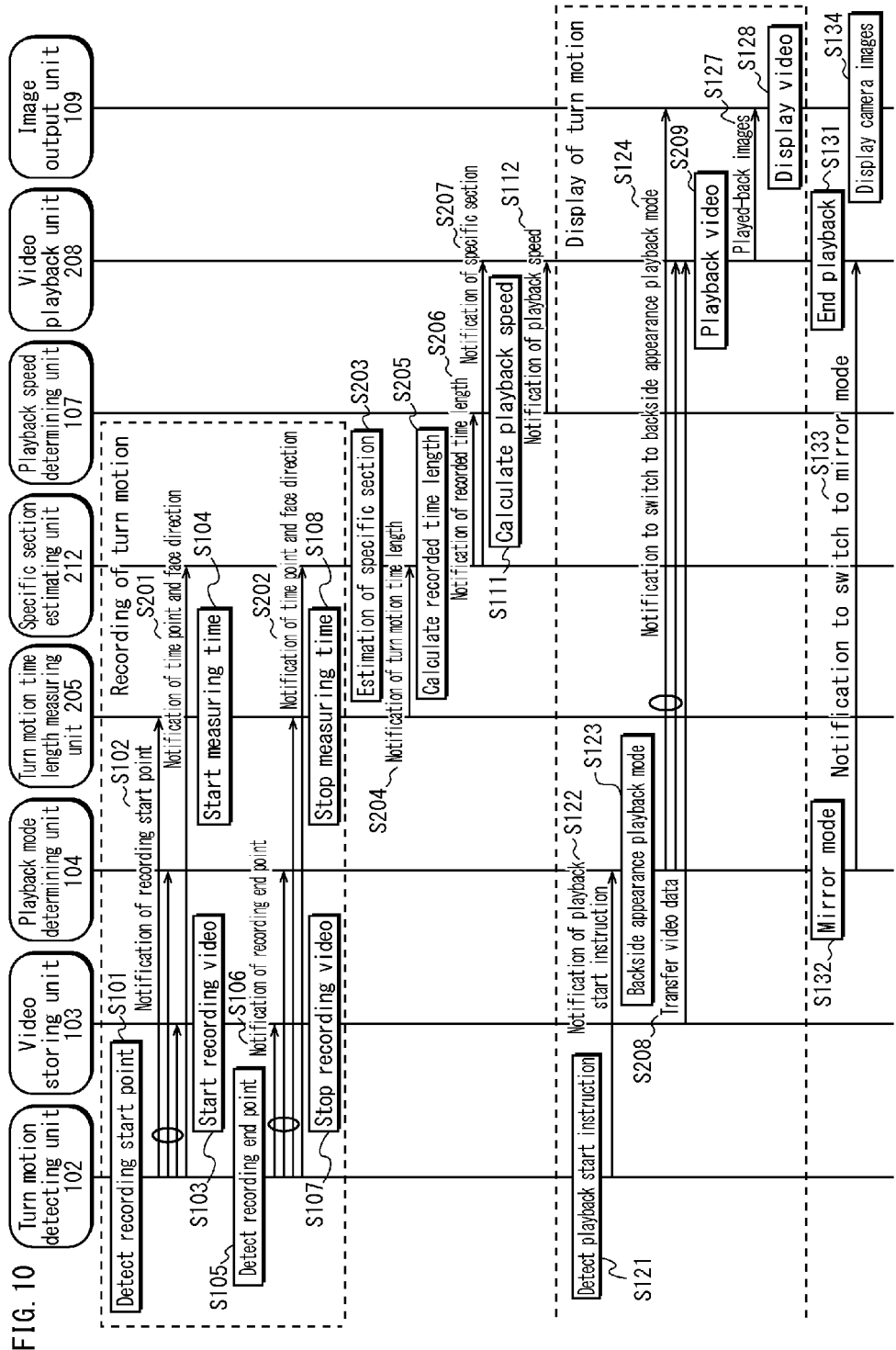
FIG. 10 is a sequential diagram illustrating operations of image processing device pertaining to embodiment 2 in playback of backside appearance.

FIG. 10 is a sequential diagram illustrating details of S32. In FIG. 10, operations already illustrated in FIG. 6 are indicated by using the same reference signs (step numbers). Further, explanation on such operations is not provided in the following.

The following provides explanation based on an example where the user makes a clockwise turn motion. The turn motion detecting unit 102 detects face direction 0°, face direction 90°, and face direction 270° in the stated order before detecting face direction 0° once again. The turn motion detecting unit 102, when detecting face direction 90° at time point Ta (S101), outputs the recording start point (S102). At the same time, the turn motion detecting unit 102 outputs timing information of the recording start point and face direction 90° to the specific section estimating unit 212 (S201). Similarly, the turn motion detecting unit 102, when detecting face direction 270° at time point Tb (S105), outputs the recording end point (S106). At the same time, the turn motion detecting unit 102 outputs timing information of the recording end point and face direction 270° to the specific section estimating unit 212 (S202). Following this, the turn motion detecting unit 102, when detecting face direction 0° once again at time point Te (S121), outputs the playback start information (S122).

The video storing unit 103 starts recording a video of the turn motion when receiving the recording start point from the turn motion detecting unit 102 (S103), and stops recording the video when receiving the recording end point from the turn motion detecting unit 102 (S107).

The turn motion time length measuring unit 205 starts measuring time when receiving the recording start point from the turn motion detecting unit 102 (S104), and stops measuring time when receiving the recording end point from the turn motion detecting unit 102 (S108). The turn motion time length measuring unit 205 notifies the specific section estimating unit 212 of the time length so measured (S204).

The specific section estimating unit 212 estimates the playback start point and the playback end point of the specific section, and the ratio of the recorded time length of the specific section to the time length measured by the turn motion time length measuring unit 205 (S203). The specific section estimating unit 212 performs the estimation by using the face directions at the recording start point and the recording end point, and the face directions at the start point and the end point of the turn motion part to be used in playback of backside appearance, which are obtained from the direction setting unit 211. When denoting the time length measured by the turn motion time length measuring unit 205 as Tc, the playback start point is calculated as a time point later than the recording start point by Tc×⅓, the playback end point is calculated as a time point later than the recording start point by Tc×⅔, and the recorded time length of the specific section is calculated as Tc×⅓, in the above-described example where the face direction at the recording start point, the face direction at the recording end point, the face direction at the start point of the turn motion part to be used in playback of backside appearance, and the face direction of the end point of the turn motion part to be used in playback of backside appearance are 90°, 270°, 150°, and 210°, respectively. The specific section estimating unit 212 obtains the time length Tc measured by the turn motion time length measuring unit 205, and calculates the timing of the playback start point, the timing of the playback end point, and the recorded time length of the specific section (S205). The specific section estimating unit 212 outputs the recorded time length Tr of the specific section, which is calculated as Tc×⅓, to the playback speed determining unit 107, and outputs the timing information of the playback start time and the playback end time to the video playback unit 208 (S207).

In the present embodiment (FIG. 9), the playback speed determining unit 107 and the playback mode determining unit 104 perform operations similar to those illustrated in FIG. 6. As such, explanation on operations by the playback speed determining unit 107 and the playback mode determining unit 104 is not provided in the present embodiment.

The video playback unit 208 reads out the specific section of the video of the turn motion stored in the video storing unit 103 according to information on the specific section that is obtained from the specific section estimating unit 212 (S208). Further, the video playback unit 208 plays back the specific section according to the playback speed ratio R specified by the playback speed determining unit 107 (S209). The operations following this point are not explained here for being similar to the corresponding operations in FIG. 6.

<Conclusion>

The image processing device pertaining to the present embodiment, provided with the above structure, achieves playing back only a particular section, specified by using face directions, of a video of backside appearance stored in the video storing unit. Thus, the image processing device pertaining to the present embodiment achieves displaying backside appearance from a particular direction that a user desires to check.

(Modification 1)

Figure 11:
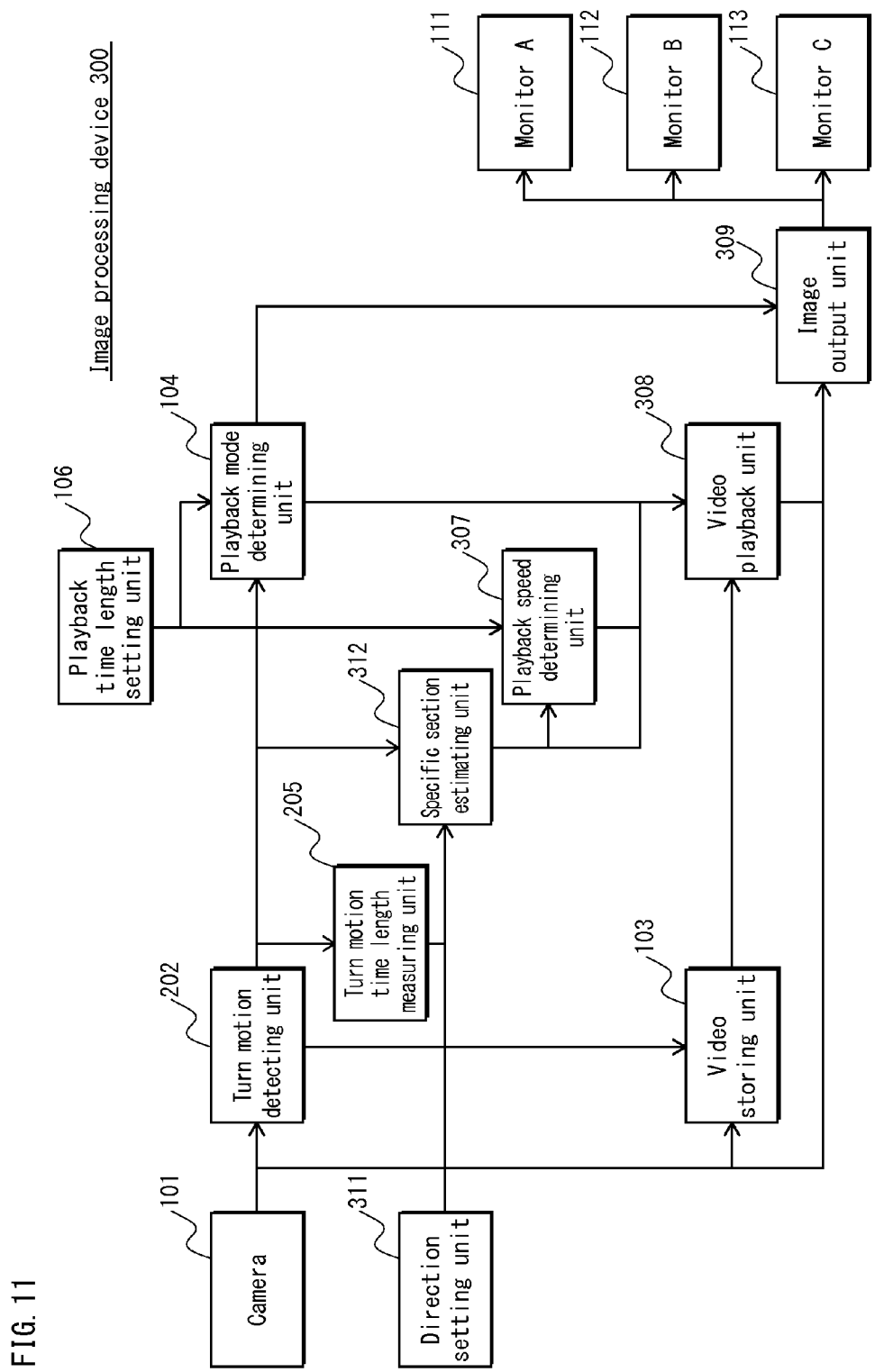
FIG. 11 is a block diagram illustrating image processing device pertaining to modification 1, which is a modification of embodiment 2.

FIG. 11 is a block diagram illustrating an image processing device 300 pertaining to modification 1. In FIG. 11, elements already illustrated in FIGS. 1 and 7 are labeled with the same reference signs. Further, explanation on such elements is not provided in the following.

Modification 1 is characterized in that the image processing device 300 divides the video of the turn motion stored in the video storing unit 103 into a plurality of sections and plays back such sections concurrently by using a plurality of monitors. Thus, each of such sections corresponds to the specific section in the present disclosure.

The image processing device 300 includes: the camera 101; the turn motion detecting unit 202; the video storing unit 103; the playback mode determining unit 104; the turn motion time length measuring unit 205; the playback time length setting unit 106; a playback speed determining unit 307; a direction setting unit 311; a specific section estimating unit 312; a video playback unit 308; an image output unit 309; a monitor A 111; a monitor B 112; and a monitor C 113.

<Explanation of Functional Blocks>

Each of the monitor A 111, the monitor B 112, and the monitor C 113 is a display device implemented by using an LCD, a PDP, or an organic EL panel. Each monitor displays images output from the image output unit 309. Further, the monitor A 111, the monitor B 112, and the monitor C 113 have the same size, and are arranged side by side at the same level, in the order of the monitor A 111, the monitor B 112, and the monitor C 113 from left to right when seen from the user or the controller of the image processing device 300.

The direction setting unit 311 obtains face directions for specifying, for each monitor, a turn motion part that is to be used in the playback of backside appearance. The direction setting unit 311 sets the face directions so obtained to the specific section estimating unit 312. In other words, for each monitor, face directions at a start point and an end point of a corresponding turn motion part that is to be used in the playback of backside appearance are set. For example, the controller of the image processing device 300 (i) sets 90° and 150°, respectively, as the face directions at the start point and the end point of the turn motion part that is to be playback on the monitor A 111, (ii) sets 150° and 210°, respectively, as the face directions at the start point and the end point of the turn motion part that is to be playback on the monitor B 112, and (iii) sets 210° and 270°, respectively, as the face directions at the start point and the end point of the turn motion part that is to be playback on the monitor C 113.

The specific section estimating unit 312 obtains, from the turn motion detecting unit 202, the timing information of the recording start point, the timing information of the recording end point, and user face directions at the recording start point and the recording end point. The specific section estimating unit 312 obtains, for each monitor, the face directions at the start point and the end point of a corresponding turn motion part from the direction setting unit 311. The specific section estimating unit 312 obtains, from the turn motion time length measuring unit 205, the time length from the recording start point to the recording end point. Further, the specific section estimating unit 312 estimates, for each monitor, the playback start point and the playback end point of the corresponding specific section. The specific section estimating unit 312 outputs, to the video playback unit 308, the timing information of the playback start points and the playback end points of the specific sections corresponding to the monitors, and outputs, to the playback speed determining unit 307, the recorded time lengths of the specific sections corresponding to the monitors.

The playback speed determining unit 307 obtains, from the specific section estimating unit 312, the recorded time lengths of the specific sections corresponding to the monitors. The playback speed determining unit 307 calculates the playback time ratio for each monitor, and outputs the playback time ratios so calculated to the video playback unit 308.

As described above, the video playback unit 308 obtains, from the specific section estimating unit 312, the playback start points and the playback end points of the specific sections corresponding to the monitors. When the playback mode determining unit 104 determines that the playback mode of the image processing device 300 is to be switched to the backside appearance playback mode, the video playback unit 308 obtains the video of the turn motion stored in the video storing unit 103, and plays back the specific sections corresponding to the monitors according to the respective playback speed ratios.

The image output unit 309 outputs, to each of the monitors, a video obtained by the video playback unit 308 playing back the corresponding specific section. Note that when the image processing device 300 is in the mirror mode, the image output unit 309 divides each captured image input from the camera 101 into a left part, a center part, and a right part each having a horizontal direction size that is one third of the horizontal direction side of the original image. The image processing device 300 outputs the left, center, and right parts to the monitor A 111, the monitor B 112, and the monitor C 113, respectively, causing the monitor A 111 to display the left part, the monitor B 112 to display the central part, and the monitor C 113 to display the right part.

<Operations>

The operations of the image processing device 300 are similar to the operations of the image processing device 200, differing only in that the following exists for each monitor: (i) face directions at the start point and the end point of the turn motion part that is used in the playback of backside appearance, which are set to the direction setting unit 311; (ii) the playback start point, the playback end point, and the recorded time length of the specific section, which are estimated by the specific section estimating unit 312; (iii) the playback speed generated by the playback speed determining unit 307; and (iv) the specific section of the video stored in the video storing unit 103, which is played back by the video playback unit 309.

Figure 12:
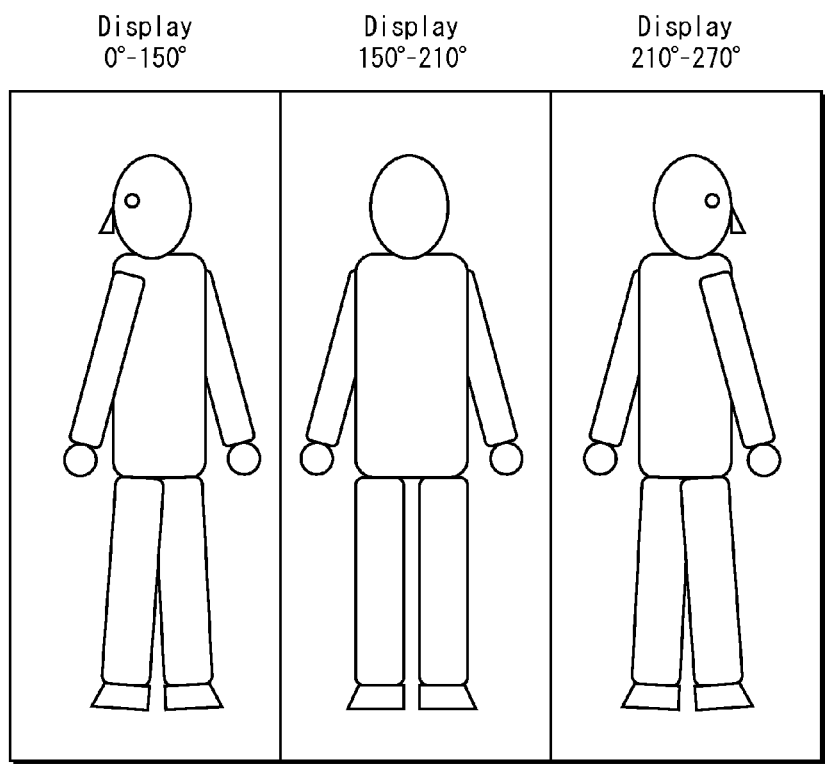
FIG. 12 is a diagram illustrating images displayed on monitors when image processing device pertaining to modification 1 operates as a three-sided mirror.

In the example described above, where (i) 90° and 150° are set, respectively, as the face directions at the start point and the end point of the turn motion part that is to be playback on the monitor A 111, (ii) 150° and 210° are set, respectively, as the face directions at the start point and the end point of the turn motion part that is to be playback on the monitor B 112, and (iii) 210° and 270° are set, respectively, as the face directions at the start point and the end point of the turn motion part that is to be playback on the monitor C 113, the image processing device 300 operates similarly to a three-side mirror, as illustrated in FIG. 12.

The image processing device 300, provided with such a structure, presents to a user backside appearance from different angles concurrently, whereby user convenience is enhanced.

<Other Modifications>

(1) In embodiments 1 and 2 and modification 1, the image processing devices 100, 200, 300 detect a turn motion of the user by using only face directions. However, the present invention is not limited to this. For example, the image processing device 100 may detect a turn motion made by the user by detecting the posture of the user's body. When making such a modification, conventional technology such as that disclosed in Japanese Patent Application Publication No. 2009-536731 may be made applicable by providing, to the image processing device 100, a distance detecting means that utilizes, for example, ultrasound waves or extremely high frequency waves, in addition to the camera 101 or a stereo camera to replace the camera 101. Japanese Patent Application Publication No. 2009-536731 discloses detecting posture by generating a depth map and detecting parts of a user's body by detecting the outline of the user's body from the depth map. By making such a modification, the direction that the user is facing can be detected even in situations where it is difficult to detect the direction that the user's face is facing, such as when the user is wearing a surgical mask concealing his/her nose and/or mouth. As another example, the image processing devices 200 and 300 may be modified so that the direction setting unit (211/311) and/or the specific section estimating unit (212/312) use, as information indicating the specific section, directions that the user's body is facing instead of face directions. By making such a modification, the direction that the user is facing can be detected even when, for example, the direction that the user's face is facing cannot be detected due to the user turning his/her back towards the camera 101.

Alternatively, a modification may be made such that the image processing device (100/200/300) detects a turn motion of the user by using user face direction when detectable, and detects a turn motion of the user by using the direction that the user's body is facing when user face direction is not detectable. By making such a modification, the direction that the user is facing can be detected even when the direction that the user's face is facing cannot be detected. Further, when user face direction is detectable, simple processing is executed since face detection, which does not involve a depth map, is performed.

(2) In embodiments 1 and 2 and modification 1, when the user makes a clockwise turn motion, the turn motion detecting unit 102 outputs the recording start point when detecting face direction 90° and outputs the recording end point when detecting face direction 270°. However, the present invention is not limited to this. For example, when the user makes a clockwise turn motion, the turn motion detecting unit 102 may output the recording start point when detecting face direction 80° and output the recording end point when detecting face direction 280°. Further, when the user makes a counter-clockwise turn motion, the turn motion detecting unit may output the recording start point when detecting face direction 280° and output the recording end point when detecting face direction 80°. That is, regardless of whether the user makes a clockwise turn motion or a counter-clockwise turn motion, the turn motion detecting unit 102 may output the recording start point at any point during a period from when the user initially faces the front to when the user faces away from the image processing device, and may output the recording end point at any point from when the user faces away from the image processing device to when the user faces the front once again. Alternatively, a modification may be made such that the target of video recording is the entire turn motion that the user makes, in which case the turn motion detecting unit 102 outputs each of the recording start point and the recording end point when detecting face direction 0°.

Alternatively, a modification may be made such that when the user makes a clockwise turn motion, the turn motion detecting unit 102 outputs the recording start point when detecting face direction 90° if user face direction equals 90° during a period from when the user initially faces the front to when the user faces backwards. That is, for example, a modification may be such that the turn motion detecting unit 102 outputs the recording start point when face direction 90° is detected if user face detection changes in the order of 80°, 90°, and 100°, but does not output the recording start point even when face direction 90° is detected if user face direction changes in the order of 80°, 90°, and 80°. By making such a modification, a user motion that is not actually a turn motion is not mistakenly determined as a turn motion. Similarly, a modification may be made such that when the user makes a clockwise turn motion, the turn motion detecting unit 102 outputs the recording end point when detecting direction 270° if user face direction equals 270° during a period from when the user faces backwards to when the user faces the front one again.

(3) In embodiments 1 and 2 and modification 1, the image capture subject is basically a person who is the user. However, the present invention is not limited to this. For example, the image capture subject may be a person differing from the person who is checking the monitor. Further, the image capture subject may not be a person and may be an animal or inorganic matter. By making such a modification, checking of background appearance of an image capture subject whose backside cannot be easily checked can be performed with a high degree of certainty, by playing back at an appropriate speed a video captured during one turn motion of the image capture subject.

(4) In modification 1, which is a modification of embodiment 2, the playback speed determining unit 307 applies the same playback time period to all monitors. However, the present invention is not limited to this. For example, the playback time length setting unit 106 may separately receive a setting of playback time length for each monitor, and may calculate the playback speeds for the monitors by using the respective playback time lengths, which may differ from one another.

(5) In embodiments 1 and 2 and modification 1, the playback mode determining unit 104 determines that operation mode is to be switched to the mirror mode when the playback time length elapses from when determining that switching to the backside appearance playback mode is necessary. However, the present invention is not limited to this. For example, the playback mode determining unit 104, having determined that the operation mode is to be switched to the backside appearance mode, may not obtain the playback time length from the playback time length setting unit 106, and instead, may make the determination that operation mode is to be switched to the mirror mode when obtaining information indicating completion of video playback from the video playback unit 108. By making such a modification, the playback mode determining unit 104 can issue the instruction for switching operation mode to the mirror mode after confirming that playback of the specific section has been completed.

Alternatively, a modification may be made such that the playback mode determining unit 104 does not immediately determine that switching to the mirror mode is necessary when video playback is completed, but instead, determines that switching to the mirror mode is necessary only after providing the monitor 110 with an instruction to display, for a predetermined time period, a still image of backside appearance stored by an image storing unit (undepicted) or a particular frame of the video stored in the video storing unit 103. The particular frame of the video when making such a modification may be a frame that has been captured at an intermediate time point exactly between the recording start point and the recording end point, for example. By making such a modification, the user is able to check backside appearance after playback of the video of backside appearance is completed.

(6) In embodiment 2 and modification 1, the direction setting unit (211, 311) obtains face directions at the start point and the end point of the turn motion part that is to be used in playback of backside appearance. However, the present invention is not limited to this. That is, for example, a modification may be made such that when the direction setting unit 211 has not obtained the face direction at the start point of the turn motion part that is to be used in playback of backside appearance, the specific section estimating unit 212 uses the recording start point as the playback start point. Similarly, a modification may be made such that when the direction setting unit 211 has not obtained the face direction at the end point of the turn motion part that is to be used in playback of backside appearance, the specific section estimating unit 212 uses the recording end point as the playback end point.

(7) In embodiment 2 and modification 1, the direction setting unit (211, 311) obtains the face directions at the start point and the end point of the turn motion part that is to be used in playback of backside appearance. However, the present invention is not limited to this. That is, for example, a modification may be made such that the direction setting unit 211 obtains each of the start point and end point of the turn motion part that is to be used in playback of backside appearance by obtaining the time length between the recording start point and the start point/end point of the turn motion part that is to be used in playback of backside appearance, or by obtaining a ratio of the time length between the recording start point and the start point/end point of the turn motion part that is to be used in playback of backside appearance to the time length between the recording start point and the recording end point, which is measured by the turn motion time length measuring unit 205.

(8) In embodiment 2 and modification 1, the specific section estimating unit (212, 312) calculates the recorded time length of the specific section by using the time length measured by the turn motion time length measuring unit 205 and the time ratio information Rp, which indicates the ratio of the recorded time length of the specific section to the time length measured by the turn motion time-length measuring unit 205. However, the present invention is not limited to this. That is, for example, a modification may be made such that the specific section estimating unit 212 calculates the recorded time length of the specific section by using timing information of the playback start point and the playback end point. By making such a modification, the same configuration and effects as those described in embodiment 2 can be achieved even when each of the playback start point and the playback end point indicates a time length of the corresponding point from the recording start point, for example.

(9) In modification 1, the image output unit 309 is connected to three monitors. However, the present invention is not limited to this. That is, the number of monitors connected to the image output unit 309 is not limited to three, and the number of monitors connected to the image output unit 309 may be any number equal to or greater than two. Further, the monitors need not have the same width, in which case the image output unit 309 divides each image to be displayed in the mirror mode into multiple parts according to the different widths of the monitors. That is, for example, when the width of the monitor B 112 is twice the width of the monitor A 111 and the monitor C113, the image output unit 309 may cause the monitor A 111, which displays the left part of each image output from the camera 101, to display one fourth of each image, and cause the monitor C 113, which displays the right part of each image, to also display one fourth of each image, while causing the monitor B 112, which displays the center part of each image, to display one half of each image that is not displayed by the other monitors.

Alternatively, a modification may be made such that in the mirror mode, the image output unit 309 outputs each image from the camera 101 as-is to only one monitor while not performing output to rest of the monitors or while causing the rest of the monitors to display, for example, a menu screen. When making such a modification, the plurality of monitors need not have the same size and need not be arranged side-by-side.

Alternatively, a modification may be made such that the image output unit 309 is connected to only one monitor, e.g., the monitor 110. When making such a modification, the image output unit 309, in the mirror mode, outputs each image output from the camera 101 as-is to the monitor 110. This is similar to the operation of the image output unit 109 in the mirror mode. Further, when making such a modification, the image output unit 309, in the backside appearance playback mode, divides the display area of the monitor 110 into a plurality of areas, and outputs, to each of such areas, played-back images output by the video playback unit 308 that correspond to one of the specific sections, whereby the same configuration and effects as those described in modification 1 are achieved.

(10) In modification 1, the direction setting unit 311 obtains, for each of the monitor A 111, the monitor B 112, the monitor C 113, the face directions at the start point and the end point of the turn motion part that is to be used in the playback of backside appearance. However, the present invention is not limited to this. That is, for example, a modification may be made such that the direction setting unit 311 obtains face directions at only two points of the turn motion part that is to be used in the playback of backside appearance. In specific, the direction setting unit 311 may obtain (i) the face direction at one point of the turn motion part that corresponds to an end point of a turn motion part that is to be played back on the monitor A 111 and also corresponds to a start point of a turn motion part that is to be played back on the monitor B 112, and (ii) the face direction at another point of the turn motion part that corresponds to an end point of the turn motion part that is to be played back on the monitor B 112 and also corresponds to a start point of a turn motion part that is to be played back on the monitor C 113. When making such a modification, the direction setting unit 311 sets the recording start point as the playback start point for the monitor A 111, and sets the recording end point as the playback end point for the monitor C113. By making such a modification, when a video is divided into n specific sections (n being an integer greater than or equal to two) that do not overlap one another, operations similar to those when providing a multiple-sided digital mirror with n mirror-functioning monitors can be achieved by using only information on (n−1) division points.

(11) In modification 1, the video stored in the video recording unit 103 is divided into a plurality of specific sections, and the specific sections are played back concurrently. However, the present invention is not limited to this. That is, for example, a modification may be made such that a different playback time length is set to each of the specific sections, and the specific sections are continuously played back on one monitor. When making such a modification, the playback time length setting unit 106 receives setting of a playback time length for each of the specific sections, the playback speed determining unit 307 determines a playback speed for each of the specific sections, and the video playback unit 308 continuously plays back the specific sections, each at a corresponding playback speed. When making such a modification, for example, similar to (10) above, the direction setting unit 311 may receive face direction 150° as the face direction at the boundary between a first specific section and a second specific section, and receive face direction 210° as the face direction at the boundary between the second specific section and a third specific section, and the playback time length setting unit 106 may receive one second, eight seconds, and one second as the playback time lengths of the first, second, and third specific sections, respectively. In this example, the first specific section from face direction 90° to face direction 150° is first played back over one second, then the second specific section from face direction 150° to face direction 210° is played back over eight seconds, and finally, the third specific section from face direction 210° to face direction 270° is played back over one second. In this example, by making the modification described above, playback of all the specific sections is performed over a ten-second period at an appropriate speed for checking backside appearance, and at the same time, the specific section corresponding to the turn motion part from face direction 150° to face direction 210°, which is of most interest to the user among the specific sections, is played back at a slow speed over an eight-second period.

Alternatively, when making the above-described modification, for example, the direction setting unit 311 may receive a face direction range of 90°-180° as a face direction range corresponding to the first specific section, a face direction range of 180°-180° as a face direction range corresponding to the second specific section, and may receive a face direction range of 180°-200° as a face direction range corresponding to the third specific section, and the playback time length setting unit 106 may receive four seconds, two seconds, and four seconds as the playback time lengths of the first, second, and third specific sections, respectively. By making such a modification, when the second specific section corresponding to the face direction 180°, which is of most interest to the user among the specific sections, is played back, a still image of the user at face direction 180° is displayed over a two-second period.

(12) In embodiments 1 and 2 and modification 1, the turn motion detecting unit 102 outputs the playback start information when detecting face direction 0° once again after detecting the recording end point, and the playback mode determining unit 104 determines that operation mode is to be switched to the background appearance playback mode when receiving the playback start information after receiving the recording start point and the recording end point in the stated order. However, the present invention is not limited to this. That is, for example, a modification may be made such that the playback mode determining unit 104 determines that switching to the background appearance playback mode is necessary when half the time measured by the turn motion time length measuring unit (105, 205) elapses after receiving the recording start point and the recording end point in the stated order. Alternatively, a modification may be made such that the playback mode determining unit 104 determines that switching to the background appearance playback mode is necessary when receiving from the user a gesture of carefully viewing the image processing device 100 after receiving the recording start point and the recording end point in the stated order.

(13) In embodiments 1 and 2 and modification 1, the video recording unit 103 starts recording the motion picture of a turn motion captured by the camera 101 when receiving the recording start point as a trigger, and stops recording the motion picture captured by the camera 101 when receiving the recording end point as a trigger. However, the present invention is not limited to this. That is, for example, a modification may be made such that the video recording unit 103 continues to record video while a turn motion is being detected in S16. When making such a modification, the same configuration and effects as those described in embodiment 1 can be achieved, for example, by modifying the turn motion detecting unit 102 so as not to output the recording start point and the recording end point to the video recording unit 103 while outputting timing information of the recording start point and the recording end point to the playback mode determining unit 104, and modifying the playback mode determining unit 104 so as to specify the section of the video stored in the video storing unit 103 from the recording start point to the recording end point (i.e., the entirety of the video stored in video storing unit 103) as the specific section. In addition, when making such a modification, the same configuration and effects as those described in embodiment 2 or modification 1 can be achieved, for example, by modifying the turn motion detecting unit 102 so as not to output the recording start point and the recording end point to the video recording unit 103 while outputting timing information of the recording start point and the recording end point to the specific section estimating unit 212, and modifying the specific section estimating unit 212 so as to specify the specific section(s) by using the recording start point and the recording end point.

(14) In embodiments 1 and 2 and modification 1, from the eyes of the user or the controller, the camera 101 is disposed at the left side of the monitor 110, as illustrated in FIG. 2. However, the present invention is not limited to this. That is, for example, the camera 101 may be disposed above or below the monitor 110.

In addition, in embodiments 1 and 2 and modification 1, the camera 101 and the monitor 110 are disposed close to one another facing the same direction. However, the present invention is not limited to this, and a modification may be made, for example, such that the image processing device (100, 200, 300) is provided with an image acquisition unit that is connected with a camera and acquires captured images, instead of being provided with the camera 101. When making such a modification, the camera connected to the image acquisition unit may be disposed anywhere, as long as the camera is able to capture images of the user.

Alternatively, a modification may be made, for example, such that the image processing device (100, 200, 300) does not include the monitor 110, and instead, the image output unit 109 is connected to an external device such as a monitor and/or a projector.

(15) In embodiments 1 and 2 and modification 1, the video playback unit (108, 208, 308) performs slow speed playback of video by continuously outputting each frame of the video at least twice. However, the present invention is not limited to this. That is, for example, a modification may be made such that the video playback unit (108, 208, 308) performs slow speed playback of video by generating an interpolation image from each pair of two consecutive frames and sequentially outputting the frames of the video including interpolation images so generated.

(16) In embodiments 1 and 2 and modification 1, S15 involves receiving from the user in the form of a gesture permission or refusal to record a motion picture being captured. However, the present invention is not limited to this. That is, a modification may be made, for example, such that the image processing device 100 is provided with an input unit for receiving user response, and the user's permission or refusal to record a motion picture being captured is received via this input unit. When making such a modification, for example, the monitor 110 may be implemented by using a touch panel and the input unit may be implemented by using a touch pad of the touch panel.

(17) In embodiments 1 and 2 and modification 1, S14 involves asking the user for permission for video recording and S16 is executed only when determining in S15 that the user's permission has been granted. However, the present invention is not limited to this. That is, a modification may be made, for example, such that the determination that the user's permission for video recording has been granted can be made without the execution of S14 and S15, in which case S16 is executed when a person is detected in S13 without requiring the execution of S14 and S15. When making such a modification, the determination that the user's permission has been granted may be made without execution of S14 and S15 when the controller of the image processing device 100 obtains an oral permission for video recording from the user. Alternatively, the determination that the user's permission has been granted may be made without execution of S14 and S15 if the controller of the image processing device 100 allows only users who agree with the recording of video to use the image processing device 100. By making such a modification, the user need not make any action with respect to the image processing device 100 to grant the image processing device 100 his/her permission for video recording, whereby the image processing device 100 can be easily controlled and used by the user.

(18) In embodiments 1 and 2 and modification 1, S18 involves detecting the user end instruction from the user, which is issued when the user leaves from the front of the image processing device (100, 200, 300) and is no longer detected. However, the present invention is not limited to this. That is, a modification may be made, for example, such that the user end instruction is detected when the user makes a predetermined gesture. Alternatively, a modification may be made such that the monitor 110 is implemented by using a touch panel and the user end instruction is detected when the user makes a touch operation with respect to the touch panel.

(19) In embodiments 1 and 2 and modification 1, in the mirror mode, the image output unit 109 outputs the captured images from the camera 101 as-is to the monitor 110. However, the present invention is not limited to this. That is, a modification may be made, for example, such that in the mirror mode, the image output unit 109 outputs the captured motion picture from the camera 101 after performing lateral inversion processing with respect to the captured motion picture. By making such a modification, the monitor 110 displays images in the same way as when the monitor 110 is a mirror, whereby the user is able to use the image processing device (100, 200, 300) as a mirror without feeling strangeness.

Similarly, a modification may be made such that in the backside appearance playback mode, the image output unit 109 performs lateral inversion processing with respect to the video images played back by the video playback unit 108.

Alternatively, lateral inversion processing of images may be performed by the camera 101 or the monitor 110.

(20) In embodiments 1 and 2 and modification 1, in the mirror mode, the image output unit 109 outputs the captured images from the camera 100 as-is to the monitor 110. However, the present invention is not limited to this. A modification may be made, for example, such that while operating in the mirror mode, the image processing device 100 provides the user with a virtual fitting function, such as that disclosed in Japanese Patent No. 4598842.

(21) In embodiments 1 and 2 and modification 1, S11 involves the controller setting a playback time length. However, the present invention is not limited to this. That is, a modification may be made, for example, such that when receiving a setting of a playback time length from the controller once, the playback time length setting unit 106 stores the playback time length having been set even after terminating processing in S20, and S11 is skipped when the playback time length setting unit 106 is already storing a playback time length. Similarly, a modification may be made, for example, such that the direction setting unit 211 is capable of storing face directions having been set and S31 is skipped when the direction setting unit 211 is already storing face directions. Alternatively, a modification may be made, for example, such that the playback time length setting unit 106 and/or the direction setting unit 211 is implemented by using a hardware switch with respect to which the controller sets in advance a playback time length, face directions, or the like, in which case S11 and/or S31 need not be performed. Alternatively, a modification may be made, for example, the playback time length setting unit 106 and/or the direction setting unit 211 is implemented by using a ROM that stores in advance a playback time length, face directions, or the like. By making such modifications, the controller is freed of the trouble of having to set a playback time, etc.

Alternatively, a modification may be made, for example, such that the user sets a playback time length when playback of backside appearance is being performed, or such that the user selects one playback time length from among a plurality of candidate playback time lengths. By making such a modification, in such a case as where the appropriate playback time length differs between differing clothes that the user is trying on, the user is able to check backside appearance at a speed appropriate for the clothing the user is currently trying on without having to ask the controller to change the settings made to the image processing device (100, 200, 300).

(22) A part or all of the constituent elements of each image processing device described up to this point (i.e., the image processing devices pertaining to the embodiments and modifications) may be implemented by using a single integrated circuit chip or multiple integrated circuit chips, may be implemented by using a computer program, or may be implemented in any another way. For example, elements of each image processing device, other than the camera and the monitor, may be implemented by using a single chip. Alternatively, the turn motion detecting unit may be implemented by using one chip, and other elements, such as the playback mode determining unit, may be implemented by using another chip.

Implementation by using an integrated circuit is typically performed by using an LSI (large scale integration). Although description is provided in the above based on an LSI, each of the one or more integrated circuits by using which elements of an image processing device are integrated may also be referred to as an IC, a system LSI, a super LSI, or an ultra LSI, depending upon the degree of integration.

Further, the integration of the above elements may be achieved by using means other than LSIs. In specific, the integration of the above elements may be achieved by using dedicated circuits or general purpose processors. Alternatively, the integration of the above elements may be achieved by using field programmable gate arrays (FPGAs) or reconfigurable processors. An FPGA is an LSI that can be programmed after the manufacturing thereof. A reconfigurable processor is an LSI having internal circuits cells whose connection and settings can be reconfigured after the manufacturing thereof.

Further, should circuit integration technology replacing LSI integration appear as a result of progress in semiconductor technology or another technology deriving from semiconductor technology, as a matter of course, the integration of the above elements (i.e., the functional blocks) may be achieved by using such technology.

Alternatively, each image processing device described up to this point (i.e., the image processing devices pertaining to the embodiments and modifications) may be implemented by using a program written to a storage medium and a computer reading and executing the program. The storage medium may be any storage medium, such as a memory card or a CD-ROM. Alternatively, each image processing device pertaining to the present invention may be implemented as a combination of a program that is downloadable via a network and a computer downloading the one or more programs via the network and executing the program. The program is a program that causes recording and playback processing to be executed, the recording and playback processing including: detecting a turn motion of an image capture subject and outputting one recording start point and one recording end point within a period in which the turn motion is detected; storing a video recording of the turn motion from the recording start point to the recording end point; calculating a recorded time length of at least one specific section of the video recording, the specific section being a section from a first time point in the video recording to a second time point in the video recording; determining a playback speed of the video recording such that playback of the specific section at the playback speed results in playback being performed for a playback time length, the playback time length being a predetermined time length that is independent from the recorded time length; and playing back the specific section at the playback speed.

(23) The embodiments and the modifications provide examples of how the present invention may be implemented, and various other improvements and modifications may be made without departing from the spirit and the scope of the present invention.

<Supplement>

The following describes the configuration and effects of an image processing device, an image processing method, and an image processing program, each of which pertaining to one aspect of the present invention.

(a) One aspect of the present invention is an image processing device including: a turn motion detection unit configured to detect a turn motion of an image capture subject and output one recording start point and one recording end point within a period in which the turn motion is detected; a video storing unit configured to store a video recording of the turn motion from the recording start point to the recording end point; a time length calculating unit configured to calculate a recorded time length of at least one specific section of the video recording, the specific section being a section from a first time point in the video recording to a second time point in the video recording; a playback speed determining unit configured to determine a playback speed of the video recording by using the recorded time length and a playback time length, the playback time length being a predetermined time length that is independent from the recorded time length; and a video playback unit configured to play back the specific section at the playback speed. In the image processing device pertaining to one aspect of the present invention, the playback speed determining unit determines the playback speed such that playback of the specific section at the playback speed results in playback being performed for the playback time length.

One aspect of the present invention is an image processing method including: detecting a turn motion of an image capture subject and outputting one recording start point and one recording end point within a period in which the turn motion is detected; storing a video recording of the turn motion from the recording start point to the recording end point; calculating a recorded time length of at least one specific section of the video recording, the specific section being a section from a first time point in the video recording to a second time point in the video recording; determining a playback speed of the video recording such that playback of the specific section at the playback speed results in playback being performed for a playback time length, the playback time length being a predetermined time length that is independent from the recorded time length; and playing back the specific section at the playback speed.

One aspect of the present invention is an image processing program for executing recording and playback processing of playing back a captured video recording while adjusting playback speed, the recording and playback processing including: detecting a turn motion of an image capture subject and outputting one recording start point and one recording end point within a period in which the turn motion is detected; storing a video recording of the turn motion from the recording start point to the recording end point; calculating a recorded time length of at least one specific section of the video recording, the specific section being a section from a first time point in the video recording to a second time point in the video recording; determining a playback speed of the video recording such that playback of the specific section at the playback speed results in playback being performed for a playback time length, the playback time length being a predetermined time length that is independent from the recorded time length; and playing back the specific section at the playback speed.

Such configurations achieve displaying, at an appropriate speed, a backside of an image capture subject making a turn motion by performing playback at a playback time length suitable for checking backside appearance of the image capture subject.

(b) In the image processing device described in (a) above, the playback speed determining unit may determine the playback speed such that a ratio of the playback speed to a recording speed of the video recording equals a ratio of the recorded time length to the playback time length.

Such a modification enables displaying the backside of the image capture subject at a constant playback speed that is appropriate for checking the backside appearance of the image capture subject.

(c) In the image processing device described in (a) above, in the turn motion, the image capture subject, which initially faces the image processing device, first turns to face a first direction, then turns away from the image processing device, and then turns to face a second direction before facing the image processing device once again, the first direction being one of the right and the left, the second direction being the other one of the right and the left, and the turn motion detecting unit may output the recording start point when the image capture subject faces the first direction in the turn motion and output the recording end point when the image capture subject faces the second direction in the turn motion.

Such a modification prevents a motion of the image capture subject that is not actually a turn motion from being determined as being a turn motion, and further, enables only playing back the backside of the image capture subject by not storing a front side of the image capture subject, which can be checked without performing delayed playback.

(d) In the image processing device described in (a) above, the specific section may be an entirety of the video recording, and the time length calculating unit may calculate, as the recorded time length, a time length of the entire video recording.

Such a modification enables directly measuring recorded time length, whereby the present invention becomes implementable with a simplified configuration.

(e) The image processing device described in (a) above may further include a specific section estimating unit configured to estimate at least one of the first time point and the second time point by using a direction that the image capture subject is facing at the recording start point, a direction that the image capture subject is facing at the recording end point, and a direction of an image capture subject for estimating the specific section.

Such a modification enables making a specification of the direction of the image capture subject for estimating the specific section in an intuitive manner and in a form that does not depend upon the time required for the image capture subject to make a turn motion.

(f) In the image processing device described in (a) above, the turn motion detecting unit may detect a direction that a face of the image capture subject is facing in a motion picture captured of the image capture subject, and detect the recording start point and the recording end point by using the detected direction.

Such a modification enables detecting the direction that the image capture subject is facing through a simple method when the image capture subject is facing the front.

(g) In the image processing device described in (a) above, the image capture subject may be a human body, and the turn motion detecting unit may detect a direction that the human body is facing in a motion picture captured of the image capture subject, and detect the recording start point and the recording end point by using the detected direction.

Such a modification enables detecting the direction that the image capture subject is facing even when a backside of the image capture subject is facing an image capture means.

(h) In the image processing device described in (a) above, the specific section may include a plurality of specific sections, and the playback speed determining unit may determine a playback speed of each of the plurality of specific sections, and the playback unit may play back the plurality of specific sections concurrently, each at the corresponding playback speed determined by the playback speed determining unit.

Such a modification enables displaying images of the backside of the image capture subject captured from different angles to be displayed concurrently, whereby convenience is enhanced.

(j) The image processing device described in (a) above may further include a playback time length setting unit configured to receive the predetermined playback time length.

Such a modification enables playing back the image capture subject at a speed appropriate for the image capture subject and/or for what is being checked, even if the appropriate speed differs between different image capture subjects and differs depending upon what is being checked.

INDUSTRIAL APPLICABILITY

The image processing device pertaining to the present invention is useful for performing delayed display of captured images of a backside of an image capture subject while adjusting display speed.

REFERENCE SIGNS LIST 100 image processing device
101 camera
102 turn motion detecting unit
103 video storing unit
104 playback mode determining unit
105 turn motion time length measuring unit
106 playback time length setting unit
107 playback speed determining unit
108 video playback unit
109 image output unit
110 monitor
211 direction setting unit
212 specific section estimating unit

The invention claimed is:

1. An image processing device comprising:
a turn motion detection unit configured to detect a turn motion of an image capture subject and output one recording start point and one recording end point within a period in which the turn motion is detected;
a video storing unit configured to store a video recording of the turn motion from the recording start point to the recording end point;
a time length calculating unit configured to calculate a recorded time length of each of a plurality of specific sections, the specific sections being continuous and composing a section of the video recording from a first time point in the video recording to a second time point in the video recording;
a playback speed determining unit configured to determine a playback speed of each of the specific sections by using the recorded time length corresponding to the specific section and a playback time length corresponding to the specific section, the playback time length being a predetermined time length that is independent from the recorded time length and being separately set for each of the specific sections; and
a video playback unit configured to sequentially play back the continuous specific sections, each of the specific sections played back at the corresponding playback speed, wherein
the playback speed determining unit determines the playback speed of each of the specific sections such that playback of the specific section at the corresponding playback speed results in playback being performed for the corresponding playback time length.

2. The image processing device of claim 1, wherein
for each of the specific sections, the playback speed determining unit determines the playback speed such that a ratio of the playback speed of the specific section to a recording speed of the specific section equals a ratio of the corresponding recorded time length to the corresponding playback time length.

3. The image processing device of claim 1, wherein
in the turn motion, the image capture subject, which initially faces the image processing device, first turns to face a first direction, then turns away from the image processing device, and then turns to face a second direction before facing the image processing device once again, the first direction being one of the right and the left, the second direction being the other one of the right and the left, and
the turn motion detecting unit outputs the recording start point when the image capture subject faces the first direction in the turn motion and outputs the recording end point when the image capture subject faces the second direction in the turn motion.

4. The image processing device of claim 1 further comprising
a specific section estimating unit configured to estimate at least one of a start time point and an end time point of at least one of the specific sections by using a direction that the image capture subject is facing at the recording start point, a direction that the image capture subject is facing at the recording end point, and an image capture subject direction for estimating the specific section, the start time point and the second time point indicating time points in the video recording at which the specific section starts and ends, respectively.

5. The image processing device of claim 1, wherein
the turn motion detecting unit detects a direction that a face of the image capture subject is facing in a motion picture captured of the image capture subject, and detects the recording start point and the recording end point by using the detected direction.

6. The image processing device of claim 1, wherein
the image capture subject is a human body, and
the turn motion detecting unit detects a direction that the human body is facing in a motion picture captured of the image capture subject, and detects the recording start point and the recording end point by using the detected direction.

7. The image processing device of claim 1 further comprising
a playback time length setting unit configured to receive, for each of the specific sections, setting of the corresponding playback time length.

8. An image processing method comprising:
detecting a turn motion of an image capture subject and outputting one recording start point and one recording end point within a period in which the turn motion is detected;
storing a video recording of the turn motion from the recording start point to the recording end point;
calculating a recorded time length of each of a plurality of specific sections, the specific sections being continuous and composing a section of the video recording from a first time point in the video recording to a second time point in the video recording;
determining a playback speed of each of the specific sections such that playback of the specific section at the corresponding playback speed results in playback being performed for a playback time length corresponding to the specific section, the playback time length being a predetermined time length that is independent from the recorded time length and being separately set for each of the specific sections; and
sequentially playing back the continuous specific sections, each of the specific sections played back at the corresponding playback speed.

9. A non-transitory computer-readable recording medium having recorded thereon an image processing program for causing a computer to execute recording and playback processing of playing back a captured video recording while adjusting playback speed, the recording and playback processing comprising:
detecting a turn motion of an image capture subject and outputting one recording start point and one recording end point within a period in which the turn motion is detected;
storing a video recording of the turn motion from the recording start point to the recording end point;
calculating a recorded time length of each of a plurality of specific sections, the specific sections being continuous and composing a section of the video recording from a first time point in the video recording to a second time point in the video recording;
determining a playback speed of each of the specific sections such that playback of the specific section at the corresponding playback speed results in playback being performed for a playback time length corresponding to the specific section, the playback time length being a predetermined time length that is independent from the recorded time length and being separately set for each of the specific sections; and
sequentially playing back the continuous specific sections, each of the specific sections played back at the corresponding playback speed.

* * * * *